(12) United States Patent
Okada

(10) Patent No.: US 11,134,209 B2
(45) Date of Patent: Sep. 28, 2021

(54) LIGHT RECEIVING DEVICE, CONTROL METHOD, AND ELECTRONIC APPARATUS

(71) Applicant: Sony Corporation, Tokyo (JP)

(72) Inventor: Motoshige Okada, Kanagawa (JP)

(73) Assignee: Sony Corporation, Tokyo (JP)

( * ) Notice: Subject to any disclaimer, the term of this patent is extended or adjusted under 35 U.S.C. 154(b) by 179 days.

(21) Appl. No.: 15/578,269

(22) PCT Filed: Jan. 11, 2017

(86) PCT No.: PCT/JP2017/000568
§ 371 (c)(1),
(2) Date: Nov. 30, 2017

(87) PCT Pub. No.: WO2017/126377
PCT Pub. Date: Jul. 27, 2017

(65) Prior Publication Data
US 2018/0313938 A1    Nov. 1, 2018

(30) Foreign Application Priority Data

Jan. 22, 2016 (JP) .............................. JP2016-010577

(51) Int. Cl.
*G01S 7/481* (2006.01)
*G01J 1/44* (2006.01)
(Continued)

(52) U.S. Cl.
CPC ............ *H04N 5/3696* (2013.01); *G01C 3/06* (2013.01); *G01J 1/44* (2013.01); *G01S 7/4816* (2013.01);
(Continued)

(58) Field of Classification Search
CPC ...... G01S 7/4816; G01S 7/4868; G01S 17/10; G01S 17/89; G01S 7/40; G01S 17/894;
(Continued)

(56) References Cited

U.S. PATENT DOCUMENTS 7,551,771 B2 *  6/2009  England, III ............ G01C 3/08
382/154
2004/0012711 A1  1/2004  Tamaru et al.
(Continued)

FOREIGN PATENT DOCUMENTS

CN    101690243 A    3/2010
CN    102622745 A    8/2012
(Continued)

OTHER PUBLICATIONS

International Search Report and English translation thereof dated Apr. 4, 2017 in connection with International Application No. PCT/JP2017/000568.
(Continued)

*Primary Examiner* — Daniel L Murphy
(74) *Attorney, Agent, or Firm* — Wolf, Greenfield & Sacks, P.C.

(57) ABSTRACT

The present technology relates to a light receiving device, a control method, and an electronic apparatus capable of suppressing saturation of a sensor that receives light.

A control unit performs exposure control to control, in accordance with a photometry result of a photometry sensor that performs photometry by receiving light, exposure of another sensor of which a light receiving surface that receives light is divided into a plurality of blocks, the exposure control being performed for each block. The present technology can be applied, for example, an electronic apparatus such as a digital camera that receives light.

12 Claims, 19 Drawing Sheets

(51) Int. Cl.
| | |
|---|---|
| *G01S 17/10* | (2020.01) |
| *G01S 17/89* | (2020.01) |
| *H04N 5/369* | (2011.01) |
| *G01C 3/06* | (2006.01) |
| *G02B 7/40* | (2021.01) |
| *G01S 7/486* | (2020.01) |
| *H04N 5/235* | (2006.01) |
| *G03B 7/093* | (2021.01) |
| *H04N 5/232* | (2006.01) |
| *G01S 17/894* | (2020.01) |

(52) U.S. Cl.
CPC ............ *G01S 7/4868* (2013.01); *G01S 17/10* (2013.01); *G01S 17/894* (2020.01); *G02B 7/40* (2013.01); *G03B 7/093* (2013.01); *H04N 5/232* (2013.01); *H04N 5/2353* (2013.01)

(58) Field of Classification Search
CPC .. G01C 3/06; G01J 1/44; G03B 7/093; H04N 5/2353; H04N 5/3696; H04N 5/232; G02B 7/40
See application file for complete search history.

(56) References Cited

U.S. PATENT DOCUMENTS

| | | | | |
|---|---|---|---|---|
| 2010/0045636 | A1* | 2/2010 | Noguchi | G06F 11/327 345/179 |
| 2012/0200842 | A1 | 8/2012 | Kamiyama | |
| 2014/0375826 | A1* | 12/2014 | Lee | H01L 51/442 348/207.1 |
| 2015/0116538 | A1 | 4/2015 | Terauchi et al. | |
| 2015/0146056 | A1 | 5/2015 | Hirota | |
| 2017/0180621 | A1* | 6/2017 | Seger | H01L 27/14634 |
| 2018/0294300 | A1* | 10/2018 | Ishida | H01L 27/1464 |
| 2018/0294306 | A1* | 10/2018 | Sambonsugi | H04N 5/23212 |

FOREIGN PATENT DOCUMENTS

| | | |
|---|---|---|
| CN | 104364608 A | 2/2015 |
| CN | 104681572 A | 6/2015 |
| JP | 2004-048561 A | 2/2004 |
| JP | 2005-173257 A | 6/2005 |
| JP | 2010-154192 A | 7/2010 |
| JP | 2014-025967 A | 2/2014 |
| JP | 2015-089033 A | 5/2015 |
| JP | 2015-128131 A | 7/2015 |
| JP | 2016-012101 A | 1/2016 |

OTHER PUBLICATIONS

Kawahito et al., A CMOS Time-of-Flight Range Image Sensor With Gates-on-Field-Oxide Structure, IEEE Sensors Journal, vol. 7, No. 12, Dec. 2007, pp. 1578-1587.

No Author Listed, Digital Camera, Wikipedia, the free encyclopedia, https://ja.wikipedia.org/w/index.php?title=%E3%83%87%E3%82%B8%E3%82%BF%E3%83%AB%E3%82%AB%E3%83%A1%E3%83%A9&oldid=58012137, Old revision as edited by Lilyca2^10 (talk|contribs) at 3:02, Dec. 26, 2015, retrieval date Mar. 22, 2017, 25 pages.

No Author Listed, EOS-1D X Catalog, Canon, http://cweb.canon.jp/pdf-catalog/eos/pdf/eos-1dx-1402.pdf , Feb. 12, 2014, retrieval date Mar. 22, 2017, 22 pages.

Written Opinion and English translation thereof dated Apr. 4, 2017 in connection with International Application No. PCT/JP2017/000568.

International Preliminary Report on Patentability and English translation thereof dated Aug. 2, 2018 in connection with International Application No. PCT/JP2017/000568.

\* cited by examiner

| PIXEL TYPE | APERTURE RATIO RATE | EXPOSURE TIME RATE | SATURATION PATTERN 1 | SATURATION PATTERN 2 |
|---|---|---|---|---|
| pa | 1 | 1 | UNSATURATED | SATURATED |
| pb | 0.75 | 0.75 | UNSATURATED | SATURATED |
| pc | 0.66 | 0.66 | UNSATURATED | SATURATED |
| pd | 0.5 | 0.5 | UNSATURATED | UNSATURATED |
| pe | 0.33 | 0.33 | UNSATURATED | UNSATURATED |
| pf | 0.25 | 0.25 | UNSATURATED | UNSATURATED |
| pg | 0.1 | 0.1 | UNSATURATED | UNSATURATED |

FIG. 12

| PIXEL TYPE | APERTURE RATIO RATE | ADDITION NUMBER | SATURATION PATTERN 1 | SATURATION PATTERN 2 |
|---|---|---|---|---|
| pa | 1 | N | UNSATURATED | SATURATED |
| pb | 0.75 | 0.75N | UNSATURATED | SATURATED |
| pc | 0.66 | 0.66N | UNSATURATED | SATURATED |
| pd | 0.5 | 0.5N | UNSATURATED | UNSATURATED |
| pe | 0.33 | 0.33N | UNSATURATED | UNSATURATED |
| pf | 0.25 | 0.25N | UNSATURATED | UNSATURATED |
| pg | 0.1 | 0.1N | UNSATURATED | UNSATURATED |

LIGHT RECEIVING DEVICE, CONTROL METHOD, AND ELECTRONIC APPARATUS

CROSS-REFERENCE TO RELATED APPLICATIONS

This is a U.S. National Stage Application under 35 U.S.C. § 371, based on International Application No. PCT/JP2017/000568, filed in the Japanese Patent Office as a Receiving Office on Nov. 11, 2017, entitled "LIGHT-RECEIVING APPARATUS, CONTROL METHOD, AND ELECTRONIC DEVICE", which claims priority to Japanese Patent Application Number JP2016-010577, filed in the Japanese Patent Office on Jan. 22, 2016, each of which is hereby incorporated by reference in its entirety.

TECHNICAL FIELD

The present technology relates to a light receiving device, a control method, and an electronic apparatus and particularly relates to a light receiving device, a control method, and an electronic apparatus capable of suppressing saturation of a sensor that receives light, for example.

BACKGROUND ART

As sensors that receive light, for example, there are image sensors (imaging sensors) that capture images or ranging sensors that perform ranging by receiving light.

As a ranging sensor, for example, there is a time of flight (ToF) sensor of a ToF scheme (for example, see Non-Patent Literature 1).

The ToF sensor has pixels that receive light and perform photoelectric conversion. The ToF sensor emits light to radiate the light to a subject. Further, in the ToF sensor, reflected light reflected and returned from the subject is received with the pixels and a distance to the subject is obtained in accordance with a time taken from the light emission to the reception of the reflected light (ranging is performed).

When the ToF sensor receives the reflected light from the subject, the light received by the pixels of the ToF sensor includes not only the reflected light from the subject but also ambient light. In the ToF sensor, by obtaining a difference between an electric signal which is a photoelectric conversion result of the reflected light (including the ambient light) from the subject and an electric signal which is the photoelectric conversion result of only the ambient light (hereinafter also referred to as an ambient light removal difference), it is possible to remove the electric signal corresponding to the ambient light.

CITATION LIST

Non-Patent Literature

Non-Patent Literature 1: Shoji Kawahito, Izhal Abdul Halin, Takeo Ushinaga, Tomonari Sawada, Mitsuru Homma and Yasunari Maeda, "A COMS Time-of-Flight Range Image Sensor With Gates-on-Field-Oxide Structure," IEEE SENSORS JOURNAL, VOL. 7, NO. 12, December 2007

DISCLOSURE OF INVENTION

Technical Problem

For example, in a case in which the ambient light received by the ToF sensor is intense light such as sunlight (direct sunlight), the pixels of the ToF sensor are saturated, and an ambient light removal difference is not obtained, and further it is difficult to perform accurate ranging.

In a case in which ambient light is intense light, pixels of an image sensor are saturated and quality of an image deteriorates in some cases.

The present technology is devised in view of such circumstances to suppress saturation of a sensor that receives light.

Solution to Problem

A light receiving device according to the present technology includes: a photometry sensor configured to perform photometry by receiving light; another sensor of which a light receiving surface which receives light is divided into a plurality of blocks; and a control unit configured to perform exposure control to control exposure of the other sensor for each block in accordance with a result obtained by the photometry performed by the photometry sensor.

A control method according to the present technology includes performing exposure control to control, in accordance with a photometry result of a photometry sensor that performs photometry by receiving light, exposure of another sensor of which a light receiving surface that receives light is divided into a plurality of blocks, the exposure control being performed for each block.

An electronic apparatus according to the present technology includes: an optical system configured to condense light; and a light receiving device configured to receive light. The light receiving device includes a photometry sensor that performs photometry by receiving light that has passed through the optical system, another sensor of which a light receiving surface that receives light that has passed through the optical system or an optical system different from the optical system is divided into a plurality of blocks, and a control unit that performs exposure control to control exposure of the other sensor for each block in accordance with a photometry result of the photometry sensor.

In the light receiving device, the control method, and the electronic apparatus according to the present technology, exposure control is performed to control, in accordance with a photometry result of a photometry sensor that performs photometry by receiving light, exposure of another sensor of which a light receiving surface that receives light is divided into a plurality of blocks, the exposure control being performed for each block.

Note that the light receiving device may be an independent apparatus or an internal block constituting one apparatus.

Advantageous Effects of Invention

The present technology can suppress saturation of a sensor that receives light.

The effects described in the specification are not limiting. That is, the present disclosure can exhibit any of the effects that are described in the present disclosure.

BRIEF DESCRIPTION OF DRAWINGS

FIG. 12 is an explanatory diagram illustrating a second pixel saturation suppression method of suppressing saturation of the ranging pixels 21 and the imaging pixels 31.

MODE(S) FOR CARRYING OUT THE INVENTION

<Embodiment of Light Receiving Device to which the Present Technology is Applied>

Figure 1:
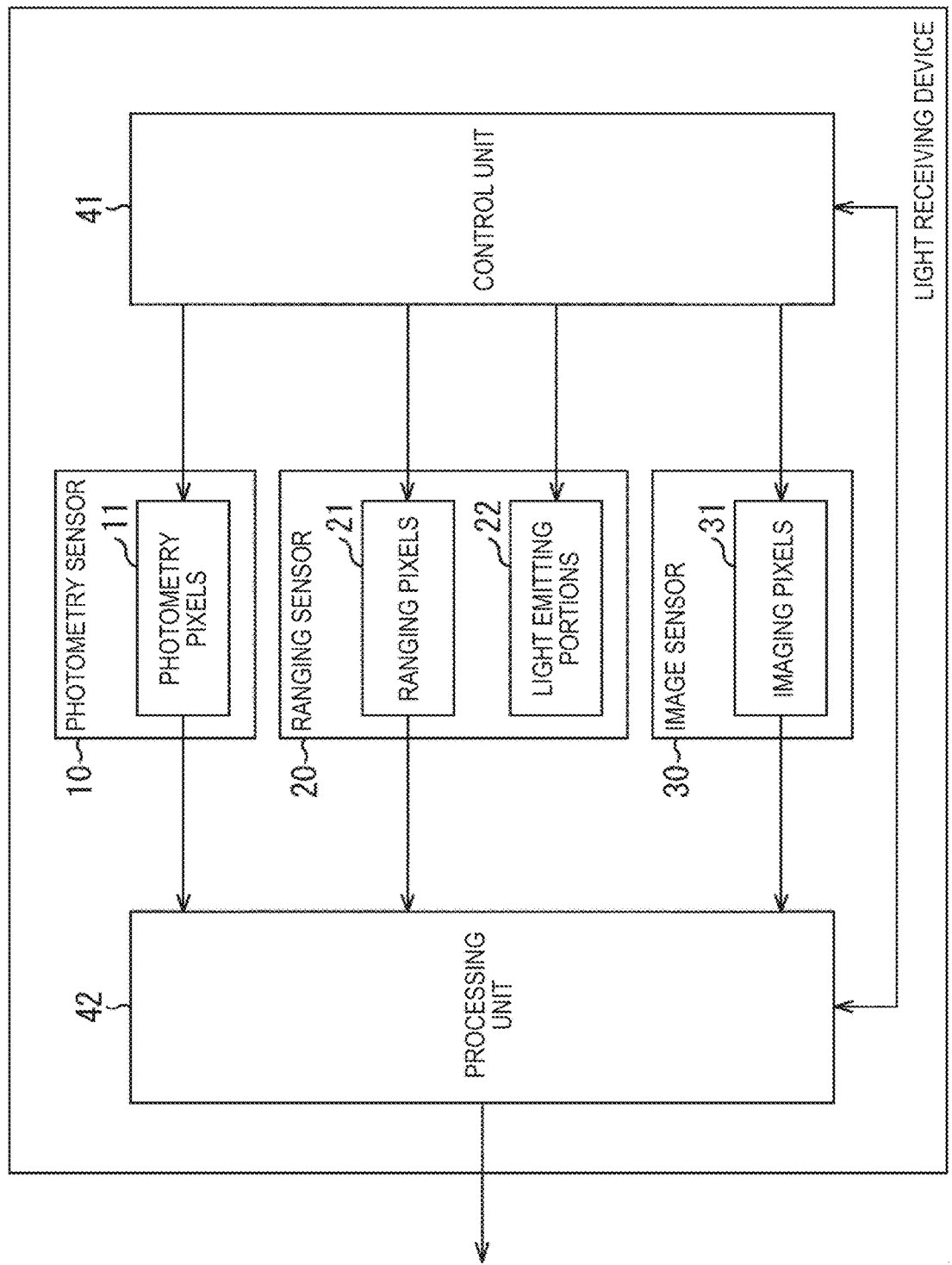
FIG. 1 is a block diagram illustrating a configuration example of a first embodiment of a light receiving device to which the present technology is applied.

FIG. 1 is a block diagram illustrating a configuration example of a first embodiment of a light receiving device to which the present technology is applied.

In FIG. 1, the light receiving device includes a photometry sensor 10, a ranging sensor 20, an image sensor 30, a control unit 41, and a processing unit 42. The light receiving device performs photometry and performs ranging or imaging by receiving light.

The photometry sensor 10 performs photometry by receiving light.

That is, the photometry sensor 10 has a plurality of photometry pixels 11. The photometry pixels 11 include, for example, photodiodes (PDs). The photometry pixels 11 receive light, perform photoelectric conversion, and output electric signals (for example, charges) corresponding to the amount (exposure amount) of received light to the processing unit 42.

The ranging sensor 20 performs ranging by receiving light.

That is, the ranging sensor 20 includes a plurality of ranging pixels 21 and light emitting portions 22. The ranging pixels 21 include, for example, PDs. The ranging pixels 21 receive light emitted by the light emitting portions 22 and reflected and returned from a subject, perform photoelectric conversion, and output electric signal corresponding to the amount of received light to the processing unit 42. The light emitting portions 22 emit, for example, light such as infrared light as electromagnetic waves used for ranging.

The image sensor 30 performs imaging by receiving light.

That is, the image sensor 30 has a plurality of imaging pixels 31. The imaging pixels 31 include, for example, PDs. The imaging pixels 31 receive light, perform photoelectric conversion, and output electric signals corresponding to the amount of received light to the processing unit 42.

For example, the control unit 41 controls the photometry sensor 10, the ranging sensor 20, the image sensor 30, and the processing unit 42 in accordance with a result or the like of a process by the processing unit 42.

The processing unit 42 performs a predetermined process on the electric signal output from the photometry sensor 10, the ranging sensor 20, or the image sensor 30 and outputs a result of the process to the outside or the control unit 41 as necessary.

In the light receiving device that has the foregoing configuration, the photometry pixels 11 of the photometry sensor 10 receive light, perform photoelectric conversion, and output electric signals corresponding to the amount of received light to the processing unit 42.

The processing unit 42 performs photometry on light (ambient light) incident on the photometry sensor 10 and the ranging sensor 20 or the image sensor 30 from the electric signal output from the photometry sensor 10 and outputs a result of the photometry (photometry result) to the control unit 41.

The control unit 41 performs exposure control to control exposure of the ranging sensor 20 or the image sensor 30 in accordance with the photometry result from the processing unit 42.

Here, as will be described below, a light receiving surface on which the ranging pixels 21 of the ranging sensor 20 are disposed or a light receiving surface on which the imaging pixels 31 of the image sensor 30 are disposed is divided into a plurality of pixel blocks. The exposure control by the control unit 41 is performed for each pixel block (the ranging pixels 21 or the imaging pixels 31 of each pixel block).

Additionally, the light receiving device in FIG. 1 includes the ranging sensor 20 and the image sensor 30 as sensors other than the photometry sensor 10. Here, as another sensor, only the ranging sensor 20 or only the image sensor 30 can be installed. Moreover, as another sensor, any sensor that receives light other than the ranging sensor 20 and the image sensor 30 can be installed.

Figure 2:
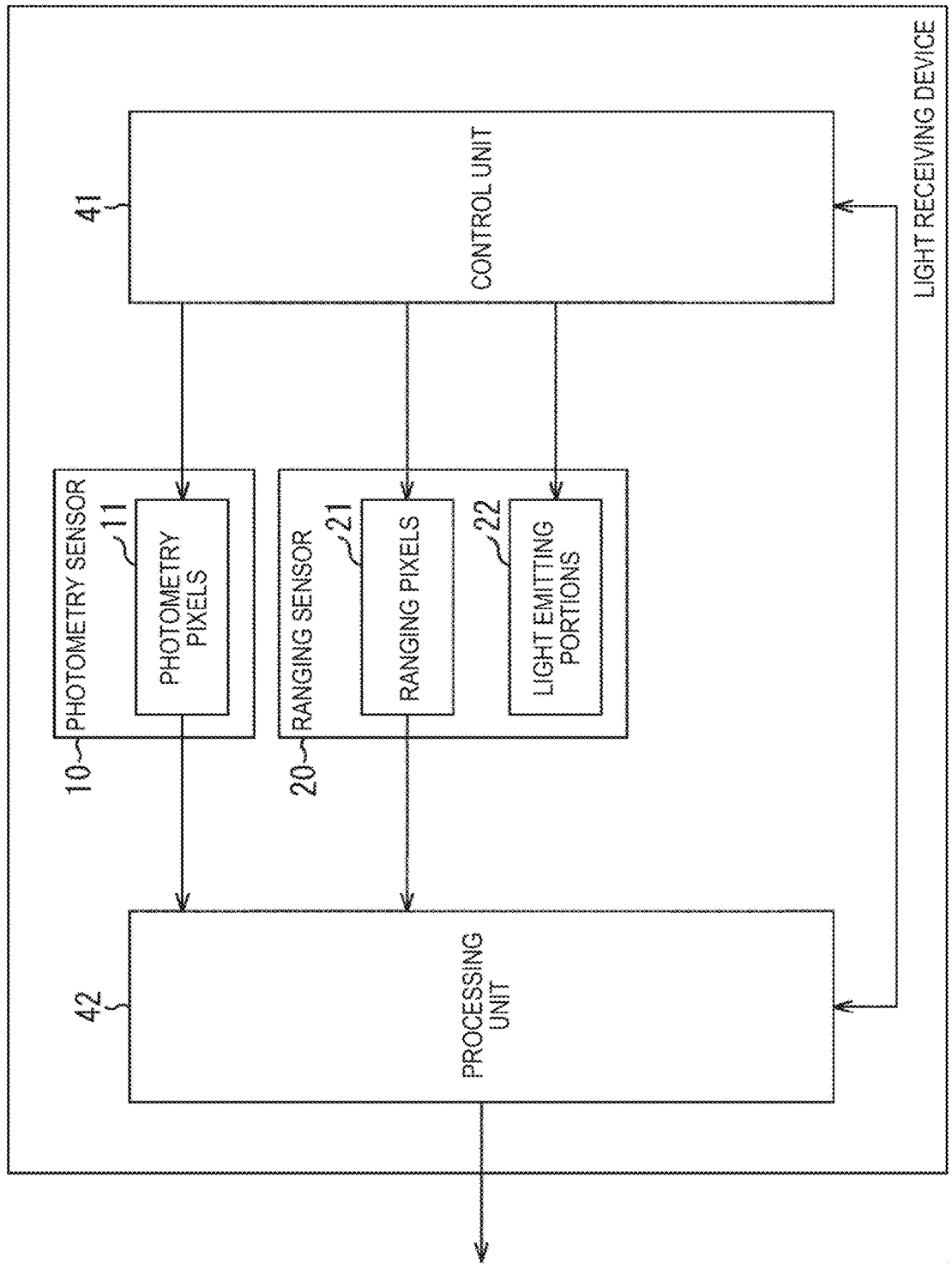
FIG. 2 is a block diagram illustrating a configuration example of a second embodiment of a light receiving device to which the present technology is applied.

FIG. 2 is a block diagram illustrating a configuration example of a second embodiment of the light receiving device to which the present technology is applied.

Additionally, throughout the drawings, the same reference numerals are given to portions corresponding to the case of FIG. 1 and the description thereof will be appropriately omitted below.

In FIG. 2, the light receiving device includes the photometry sensor 10, the ranging sensor 20, the control unit 41, and the processing unit 42.

Accordingly, the light receiving device in FIG. 2 is common to the case of FIG. 1 in that the photometry sensor 10, the ranging sensor 20, the control unit 41, and the processing unit 42 are included, and is different from the case of FIG. 1 in that the image sensor 30 is not included.

In the light receiving device of FIG. 2 that has the foregoing configuration, the photometry sensor 10, the ranging sensor 20, the control unit 41, and the processing unit 42 perform the similar processes as in FIG. 1.

Figure 3:
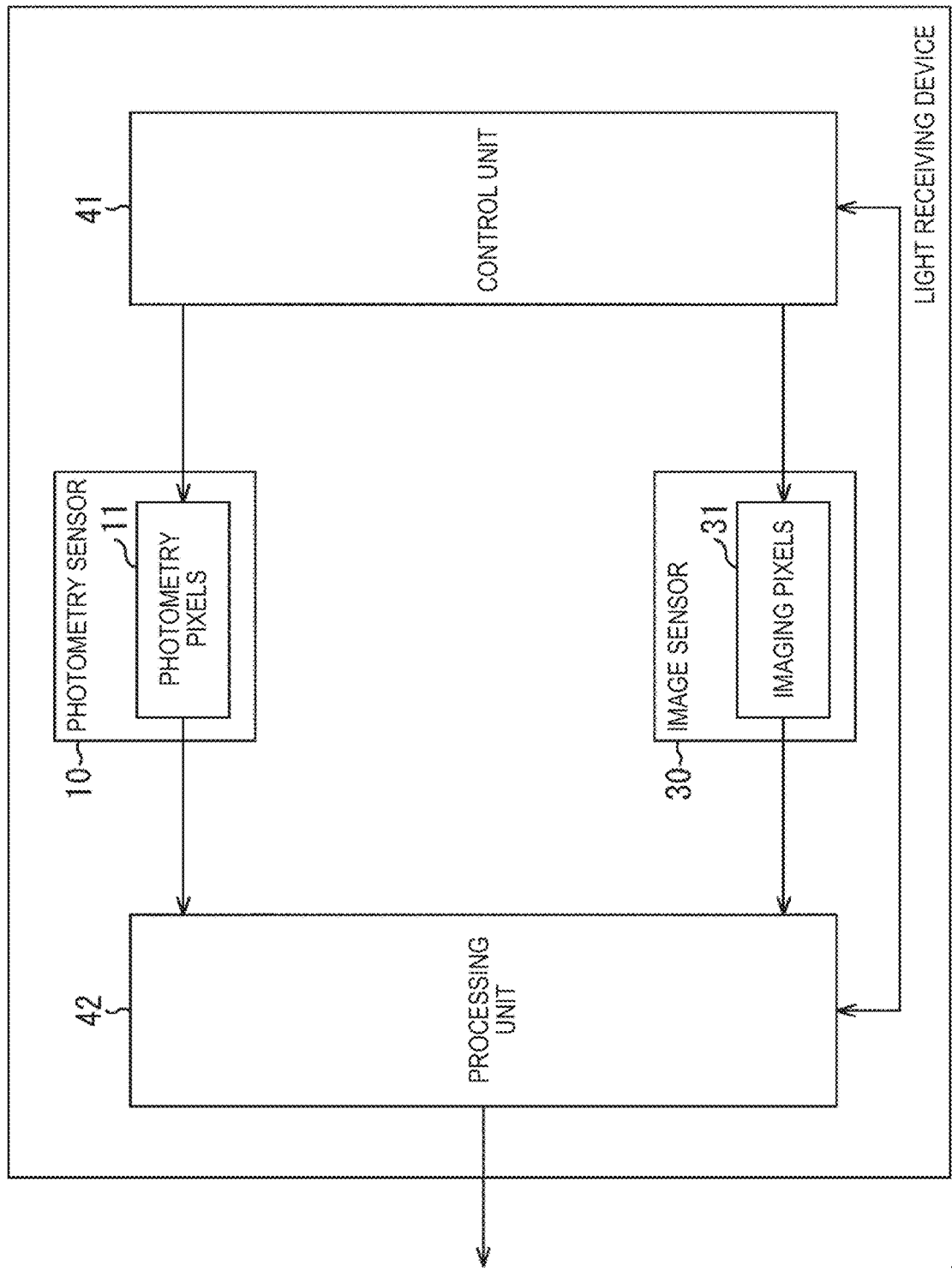
FIG. 3 is a block diagram illustrating a configuration example of a third embodiment of a light receiving device to which the present technology is applied.

FIG. 3 is a block diagram illustrating a configuration example of a third embodiment of the light receiving device to which the present technology is applied.

Additionally, throughout the drawings, the same reference numerals are given to portions corresponding to the case of FIG. 1 and the description thereof will be appropriately omitted below.

In FIG. 3, the light receiving device includes the photometry sensor 10, the image sensor 30, the control unit 41, and the processing unit 42.

Accordingly, the light receiving device in FIG. 3 is common to the case of FIG. 1 in that the photometry sensor 10, the image sensor 30, the control unit 41, and the processing unit 42 are included, and is different from the case of FIG. 1 in that the ranging sensor 20 is not included.

In the light receiving device that has the foregoing configuration in FIG. 3, the photometry sensor 10, the image sensor 30, the control unit 41, and the processing unit 42 perform the similar processes as in FIG. 1.

<Ranging Sensor 20>

Figure 4:
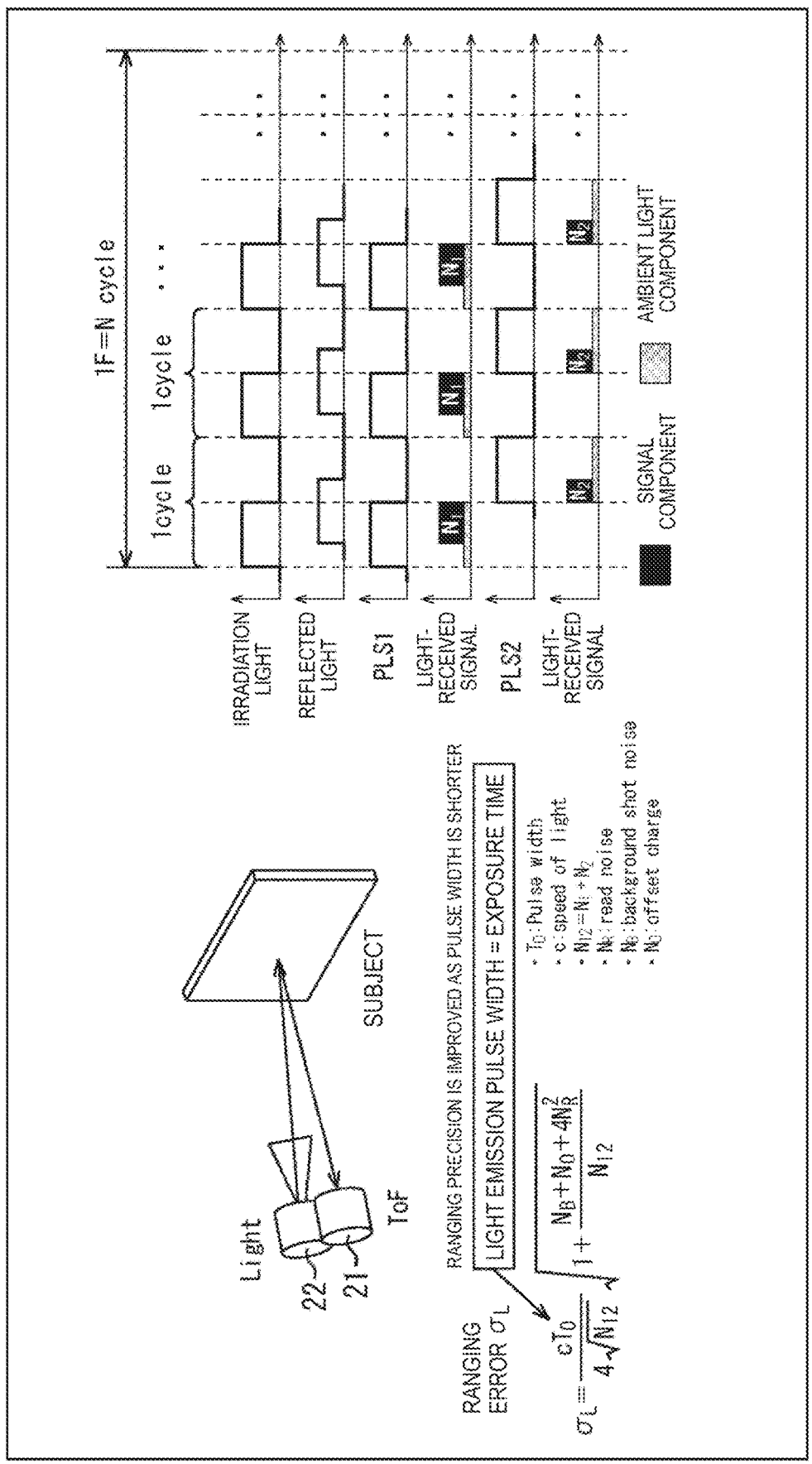
FIG. 4 is an explanatory diagram illustrating an example of ranging by a ranging sensor 20.

FIG. 4 is an explanatory diagram illustrating an example of ranging by the ranging sensor 20.

The ranging sensor 20 is, for example, a ToF sensor and repeatedly emits pulsed irradiation light from the light emitting portions 22. Further, the ranging sensor 20 calculates a distance to a subject (performs ranging) by the ranging pixels 21 receiving reflected light that is the irradiation light that has been reflected and returned from the subject.

Here, a period of a pulse of irradiation light is referred to as a cycle.

Moreover, a duration in which the pulse of the irradiation light is turned on (a high (H) level) (a duration of a pulse PLS1 in FIG. 4 is at the H level) is an exposure time, and $N_1$ denotes a light-received signal (a charge amount) which is an electric signal obtained through photoelectric conversion of the reflected light received by the ranging pixels 21.

Further, a duration in which the pulse of the irradiation light is turned off (a low (L) level) (a duration of a pulse PLS2 in FIG. 4 is at the L level) is an exposure time, and $N_2$ denotes a light-received signal (a charge amount) which is an electric signal obtained through photoelectric conversion of the reflected light received by the ranging pixels 21.

A ratio of the light-received signal $N_1$ or the light-received signal $N_2$ to both of the light-received signal $N_1$ and the light-received signal $N_2$ (e.g., $N_1/(N_1+N_2)$ or $N_2/(N_1+N_2)$) corresponds to a time in which the irradiation light is reflected from a subject and the reflected irradiation light which is the irradiation light reflected from the subject returns, and further corresponds to a distance to the subject.

Accordingly, the ranging sensor 20 (the processing unit 42 that processes an electric signal output by the ranging sensor 20) which is the ToF sensor calculates a distance to the subject using the light-received signals $N_1$ and $N_2$.

Additionally, a ranging error $\sigma_L$ of the ranging sensor 20 which is the ToF sensor is expressed in the following equation.

$$\sigma_L = \frac{cT_0}{4\sqrt{N_{12}}} \sqrt{1 + \frac{N_B + N_O + 4N_R^2}{N_{12}}} \quad (1)$$

Here, $T_0$ indicates a pulse width of the pulse of the irradiation light and c indicates a light velocity. Moreover, $N_{12}$ indicates an added value $N_1+N_2$ of the light-received signals $N_1$ and $N_2$ and $N_R$ indicates read noise. $N_B$ indicates background shot noise and $N_O$ indicates an offset charge.

According to Equation (1), the ranging error $\sigma_L$ is proportional to the pulse width $T_0$ of the irradiation light. Therefore, ranging precision is improved as the pulse width $T_0$ of the irradiation light is smaller.

It is assumed that a predetermined time longer than one cycle is set as 1 frame (1 F) and one frame includes N cycles which are a plurality of predetermined cycles.

In the ranging sensor 20 which is the ToF sensor, an exposure result of exposure of the ranging pixels 21 for each cycle is added by N cycles that configure one frame at maximum and a distance to the subject is obtained from the obtained sum.

The ranging precision is improved as the number of cycles to be added is greater, that is, as an integrated value of one frame for the exposure time of the ranging pixels 21 is greater.

Additionally, a ranging sensor other than the ToF sensor can be adopted as the ranging sensor 20.

Incidentally, at the time of exposure of the ranging pixels 21, that is, when the ranging pixels 21 receive the reflected light from the subject, the light received by the ranging pixels 21 includes not only the reflected light (a signal component) from the subject but also ambient light (a noise component).

In a case in which the integrated value of one frame of the exposure time of the ranging pixels 21 is set to be large to improve the ranging precision, the ranging pixels 21 are saturated when the ambient light is intense light such as sunlight (direct sunlight), and thus it is difficult to perform accurate ranging.

<Configuration Example of Ranging Sensor 20 and Image Sensor 30 Also Serving as Photometry Sensor 10>

Figure 5:
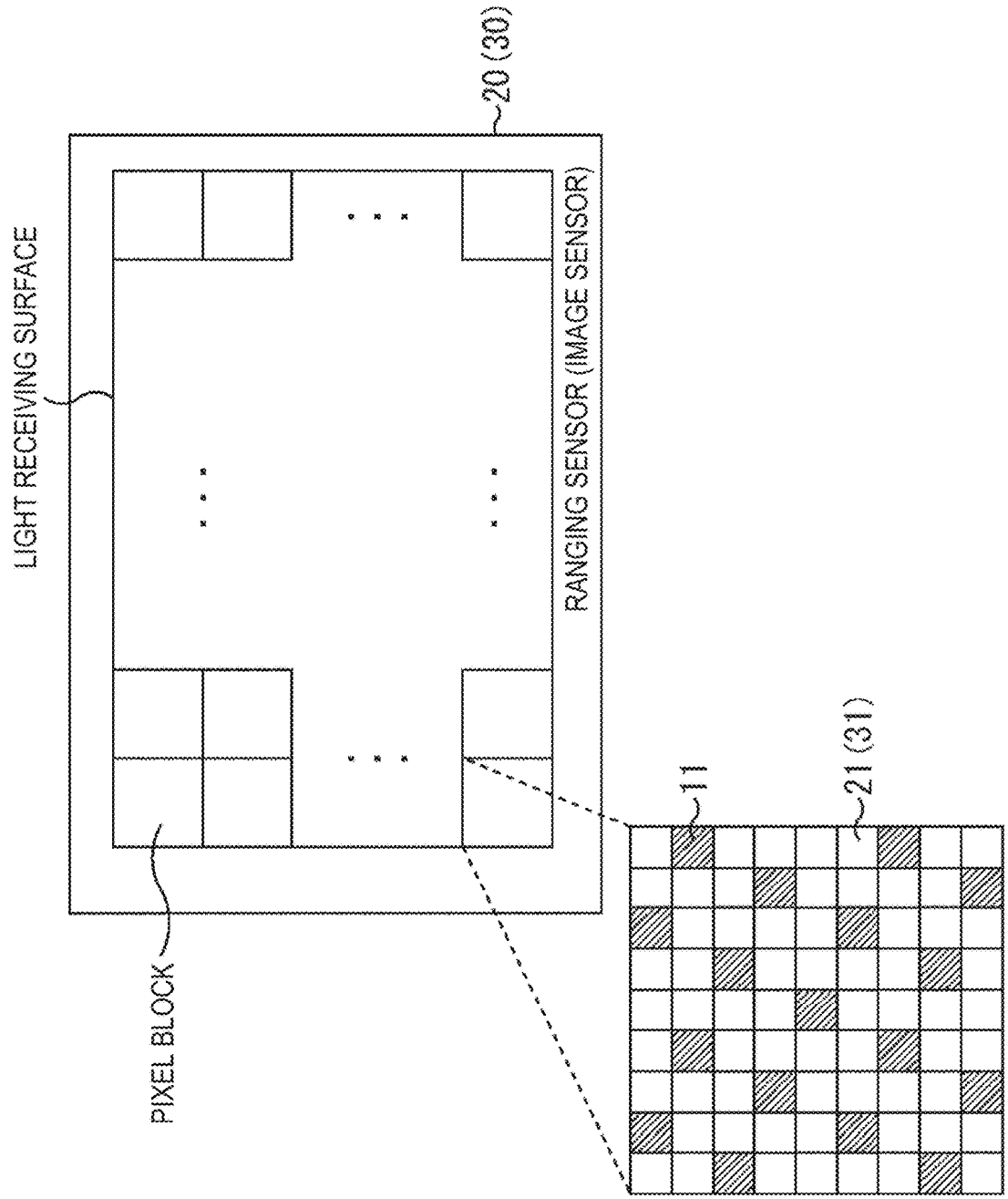
FIG. 5 is a plan view illustrating an overview of a configuration example of the ranging sensor 20 also serving as a photometry sensor 10.

FIG. 5 is a plan view illustrating an overview of a configuration example of the ranging sensor 20 that also serves as the photometry sensor 10.

The ranging sensor 20 can also serve as the photometry sensor 10.

In FIG. 5, the ranging sensor 20 has, for example, a rectangular light receiving surface. The light receiving surface is divided into rectangular pixel blocks in a matrix form.

In the pixel block, for example, a plurality of pixels are disposed in a matrix form.

In a case in which the ranging sensor 20 does not serve as the photometry sensor 10, only one or more ranging pixels 21 are disposed (in the matrix form) in the pixel block.

In a case in which the ranging sensor 20 also serves as the photometry sensor 10, the photometry pixels 11 are included in addition to the ranging pixels 21 in the pixel block.

In the ranging sensor 20 that also serves as the photometry sensor 10, the plurality of photometry pixels 11 are disposed at random (uniformly) in the pixel block.

As described above, by disposing the photometry pixels 11 performing photometry in addition to the ranging pixels 21 in the pixel block, it is possible to measure a distribution of light energy amount of the light receiving surface and control exposure for each pixel block.

That is, whether saturation of (charges of) the ranging pixels 21 with respect to the amount of light incident on the light receiving surface occurs can be determined for each pixel block from an electric signal (photometry result) output by the photometry pixels 11 corresponding to each pixel block, that is, the photometry pixels 11 included in each pixel block, and exposure of the ranging pixels 21 can be controlled for each pixel block in accordance with a determination result.

Here, even in a case in which the ranging sensor 20 does not serve as the photometry sensor 10, whether the ranging pixels 21 of the ranging sensor 20 are saturated can be determined for each pixel in accordance with an electric signal output by the photometry sensor 10.

That is, when the light received by the photometry sensor 10 is (substantially) identical to the light received by the ranging sensor 20, the amount of light incident on a certain pixel block B of the ranging sensor 20 can be ascertained from an electric signal output by the photometry pixels 11 corresponding to the pixel block B of the photometry sensor 10, that is, the photometry pixels 11 disposed in an area corresponding to the pixel block B. Accordingly, whether the ranging pixels 21 of the pixel block B of the ranging sensor 20 are saturated can be determined from an electric signal output by the photometry pixels 11 corresponding to the pixel block B.

Additionally, the image sensor 30 can also serve as the ranging sensor 10, as in the ranging sensor 20. That is, in the above description of FIG. 5, "ranging sensor 20" and "ranging pixels 21" can be replaced with "image sensor 30" and "imaging pixels 31."

Moreover, in the ranging sensor 20 that also serves as the photometry sensor 10, as illustrated in FIG. 5, the photometry pixels 11 and the ranging pixels 21 can be disposed on one (semiconductor) substrate configuring the ranging sensor 20, that is, the photometry pixels 11 and the ranging pixels 21 can be disposed on the same substrate.

Further, for the ranging sensor 20 that also serves as the photometry sensor 10, the ranging sensor 20 can have a stacked structure, the photometry pixels 11 can be disposed on one substrate configuring the ranging sensor 20, and the ranging pixels 21 can be disposed on another substrate configuring the ranging sensor 20.

That is, in the ranging sensor 20 that also serves as the photometry sensor 10, the substrate on which the photometry pixels 11 are disposed and the substrate on which the ranging pixels 21 are disposed can be included in a stacked manner.

The above-described points are also the same in the image sensor 30 that also serves as the photometry sensor 10.

Figure 6:
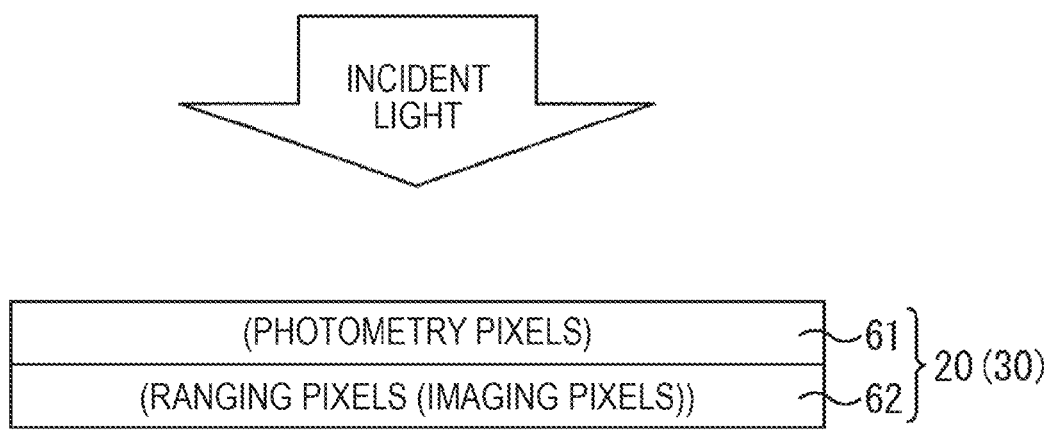
FIG. 6 is a side view illustrating an overview of another configuration example of the ranging sensor 20 also serving as the photometry sensor 10.

FIG. 6 is a side view illustrating an overview of another configuration example of the ranging sensor 20 that also serves as the photometry sensor 10.

In FIG. 6, the ranging sensor 20 has a stacked structure in which a substrate 61 on which the photometry pixels 11 are disposed and a substrate 62 on which the ranging pixels 21 are disposed are stacked.

In the ranging sensor 20 in FIG. 6, for example, when viewed from the upper surface side, the photometry pixels 11 and the ranging pixels 21 can be disposed on the substrates 61 and 62, respectively, in the similar pattern as that of FIG. 5.

In FIG. 6, the substrate 61 on which the photometry pixels 11 are disposed is disposed on the upper side (a side on which light is incident) and the substrate 62 on which the ranging pixels 21 are disposed is disposed on the lower side.

Portions of the upper substrate 61 facing the ranging pixels 21 disposed on the lower substrate 62 can be formed of, for example, a transparent material so that light passes through to the lower substrate 62.

Additionally, the image sensor 30 that also serves as the photometry sensor 10 can have a stacked structure as in the ranging sensor 20 that also serves as the photometry sensor 10 in FIG. 6.

Figure 7:
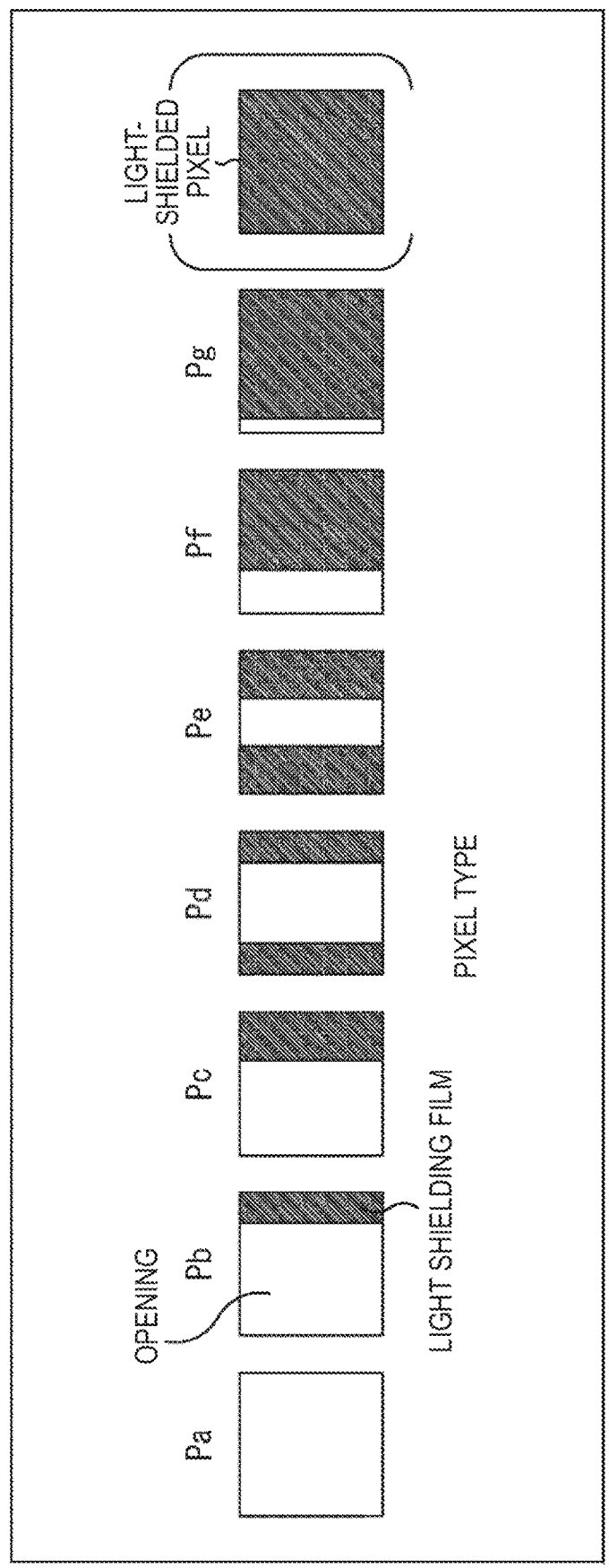
FIG. 7 is a diagram illustrating a configuration example of photometry pixels 11.

FIG. 7 is a diagram illustrating a configuration example of the photometry pixels 11.

In a case in which the ranging sensor 20 or the image sensor 30 also serves as the photometry sensor 10, each pixel block of the ranging sensor 20 or the image sensor 30 has, for example, pixels of a plurality of pixel types such as pixel types pa, pb, pc, pd, pe, pf, and pg as the photometry pixels 11.

In a case in which the ranging sensor 20 or the image sensor 30 does not serve as the photometry sensor 10, the photometry sensor 10 has, for example, pixels of a plurality of pixel types such as pixel types pa, pb, pc, pd, pe, pf, and pg in each area of the light receiving surface corresponding to each pixel block of the ranging sensor 20 or the image sensor 30.

In the pixels of the pixel types pa to pg, openings are appropriately shielded by light shielding films and aperture ratios are different.

In the pixel of the pixel type pa, the opening is not shielded from light and the aperture ratio is set to 1 (100%). In the pixels of the pixel types pb to pg, parts of the openings are shielded from light and the aperture ratios are, for example, 0.75, 0.66, 0.5, 0.33, 0.25, and 0.1, respectively.

Here, the photometry pixels 11 included in the pixel block of the ranging sensor 20 or the image sensor 30 in a case in which the ranging sensor 20 or the image sensor 30 also serves as the photometry sensor 10 and the photometry pixels 11 of the area of the light receiving surface of the photometry sensor 10 corresponding to the pixel block of the ranging sensor 20 or the image sensor 30 in a case in which the ranging sensor 20 or the image sensor 30 does not serve as the photometry sensor 10 are both referred to as the photometry pixels 11 corresponding to the pixel block.

As the photometry pixels 11 corresponding to one pixel block, at least the pixels of the pixel types pa to pg can be adopted one by one.

Further, the numbers of pixel types pa to pg of the photometry pixels 11 corresponding to one pixel block may be the same number or may be different numbers.

Moreover, as the photometry pixels 11 corresponding to one pixel block, light-shielded pixels (pixels with an aperture ratio of 0) of which openings are completely shielded from light can be adopted in addition to the pixels of the pixel types pa to pg.

<Pixel Saturation Suppression Methods>

Figures 8, 9:
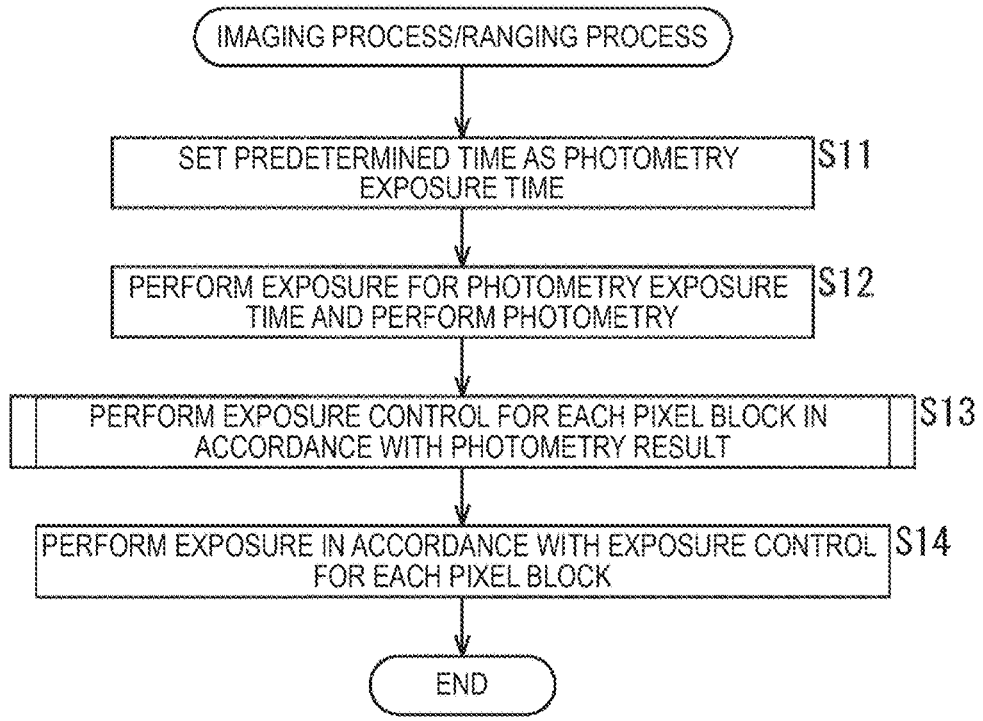
FIG. 8 is an explanatory diagram illustrating a first pixel saturation suppression method of suppressing saturation of ranging pixels 21 and imaging pixels 31.
FIG. 9 is an explanatory flowchart illustrating an example of a ranging process using the ranging sensor 20 and an imaging process using an image sensor 30.

FIG. 8 is an explanatory diagram illustrating a first pixel saturation suppression method of suppressing saturation of the ranging pixel 21 and the imaging pixel 31.

In the photometry pixels 11 corresponding to the pixel block, the ranging pixels 21 or the imaging pixels 31 of the pixel block can be suppressed by measuring the amount of light incident on the ranging sensor 20 or the image sensor 30 in each frame and performing exposure control (driving control) of the ranging pixels 21 or the imaging pixels 31 of the pixel block without performing complicated calculation.

Here, as a method of improving ranging precision of the ranging sensor 20, for example, there is a method of magnifying the intensity of an electromagnetic wave (infrared light) emitted by the light emitting portion 22. Further, as a method of improving the ranging precision, there is a method of increasing the frequency of a sine wave in a case in which the electromagnetic wave emitted by the light emitting portion 22 is the sine wave, and there is a method of shortening a pulse width of pulses in a case in which the electromagnetic wave emitted by the light emitting portions 22 is the pulse.

As described above, the ranging sensor 20 has a configuration capable of performing a high-speed operation in which exposure is performed for a short time of a nanosecond level as exposure of the ranging pixels 21 as the frequency of the sine wave serving so that the electromagnetic wave issued by the light emitting portions 22 is increased or the pulse width of the pulse serving as the electromagnetic wave is shortened.

In a case in which the exposure can be performed for a short time of the nanosecond level in the ranging sensor 20 (the ranging pixels 21 of the ranging sensor 20) or the image sensor 30 (the imaging pixels 31 of the image sensor 30), saturation of the ranging pixels 21 or the imaging pixels 31 can be suppressed by the following first pixel saturation suppression method or second pixel saturation suppression method.

In the first pixel saturation suppression method, saturation of the ranging pixels 21 and the imaging pixels 31 in one frame is suppressed by performing exposure control to appropriately set an exposure time in accordance with an electric signal (photometry result) output by the photometry pixels 11 corresponding to the pixel block for each pixel block of the ranging pixels 21 or the imaging pixels 31.

According to the first pixel saturation suppression method, it is possible to suppress overflow of charges serving as an electric signal obtained through the photoelectric conversion by the ranging pixels 21 and the imaging pixels 31 as the saturation of the ranging pixels 21 and the imaging pixels 31.

In the second pixel saturation suppression method, it is assumed that the ranging pixels 21 or the imaging pixels 31 are repeatedly exposed for a short exposure time in one frame, an electric signal (an exposure result) output from the ranging pixels 21 or the imaging pixels 31 in each exposure is added using storage means such as a memory, and the added value is set as a pixel value of the ranging pixels 21 and the imaging pixels 31.

In the second pixel saturation suppression method, saturation of the ranging pixels 21 and the imaging pixels 31 in one frame is suppressed by performing exposure control to appropriately set an addition number (for example, the number of exposure results to be added) which adds an exposure result of the ranging pixels 21 or the imaging pixels 31 in accordance with an electric signal (exposure result) output by the photometry pixel 11 corresponding to the pixel block for each pixel block of the ranging pixels 21 or the imaging pixels 31.

According to the second pixel saturation suppression method, it is possible to suppress excess of the pixel value of the ranging pixels 21 and the imaging pixels 31 over a maximum value (a pixel value corresponding to a maximum charge amount that can be accumulated in the ranging pixels 21 and the imaging pixels 31) as saturation of the ranging pixels 21 and the imaging pixels 31.

As described above, by performing the exposure control for each pixel block and suppressing the saturation of the ranging pixels 21 and the imaging pixels 31, it is possible to magnify a dynamic range of an image including a pixel value (indicating a distance) of the ranging pixels 21 or an image including a pixel value of the imaging pixels 31.

Here, both or one of the ranging pixel 21 and the imaging pixel 31 is also referred to as a light receiving pixel below.

In FIG. 8, pixel types are the pixel types pa to pg described in FIG. 7. An aperture ratio rate indicates a rate value of the aperture ratio of each pixel type to the aperture ratio of 100% (when a rate is a:b, the rate is expressed to a/b and is equal to an aperture ratio of each pixel type). An exposure time rate indicates a rate value of a photometry exposure time which is an exposure time of the photometry pixels 11 to a light-receiving exposure time which is an exposure time of the light receiving pixels. The exposure time rate is equal to an aperture ratio rate.

In the first pixel saturation suppression method, a certain time is set as the photometry exposure time and exposure is first performed for the photometry exposure time. Then, whether each of the photometry pixels 11 of the pixel types pa to pg is in a saturated state or an unsaturated state is determined in accordance with the exposure for the photometry exposure time.

Here, as illustrated in saturation pattern 1 of FIG. 8, in a case in which all the photometry pixels 11 of the pixel types pa to pg are in the unsaturated state, for example, the light-receiving exposure time is set using the exposure time rate of the photometry pixel 11 of the pixel type pa in which the aperture ratio rate is the maximum among the photometry pixels 11 in the unsaturated state.

That is, a multiplied value obtained by multiplying the photometry exposure time by the exposure time rate of the photometry pixel 11 of the pixel type pa is set as the light-receiving exposure time. Since the exposure time rate of the photometry pixel 11 of the pixel type pa is 1, the light-receiving exposure time is set to the same time as the photometry exposure time in a case in which the light-receiving exposure time is set using the exposure time rate of the photometry pixel 11 of the pixel type pa.

As illustrated in saturation pattern 2 of FIG. 8, in a case in which the photometry pixels 11 of the pixel types pa to pc are in the saturated state and the photometry pixels 11 of the remaining pixel types pd to pg are in the unsaturated state among the pixel types pa to pg, for example, the light-receiving exposure time is set using the exposure time rate of the photometry pixels 11 of the pixel type pd in which the aperture ratio rate is the maximum among the photometry pixels 11 in the unsaturated state.

That is, a multiplied value obtained by multiplying the exposure time rate of the photometry pixel 11 of the pixel type pd for the photometry exposure time is set as the light-receiving exposure time. Since the exposure time rate of the photometry pixel 11 of the pixel type pd is 0.5, the light-receiving exposure time is set to a time of 0.5 times of the photometry exposure time in a case in which the light-receiving exposure time is set using the exposure time rate of the photometry pixel 11 of the pixel type pd.

FIG. 9 is an explanatory flowchart illustrating an example of a ranging process using the ranging sensor 20 and an imaging process using the image sensor 30.

In step S11, the control unit 41 sets a predetermined default time as the photometry exposure time, and then the process proceeds to step S12.

In step S12, the control unit 41 causes the photometry pixels 11 to receive light only for the photometry exposure time and performs photometry by controlling the photometry sensor 10 and performing exposure for the photometry exposure time.

A photometry result of the photometry pixels 11 is supplied to the control unit 41 via the processing unit 42 and the process proceeds from step S12 to step S13.

In step S13, the control unit 41 performs exposure control of the ranging pixels 21/the imaging pixels 31 for each pixel block in accordance with a photometry result of the photometry pixels 11, and then the process proceeds to S14.

Here, in the exposure control of step S13, the saturation of the ranging pixels 21/the imaging pixels 31 is suppressed by the first or second pixel saturation suppression method.

In step S14, the ranging sensor 21/the image sensor 30 receives light with the ranging pixels 21/the imaging pixels 31 and performs the ranging/the imaging by performing the exposure in accordance with the exposure control for each pixel block by the control unit 41 in step S13, and then the process ends.

Figure 10:
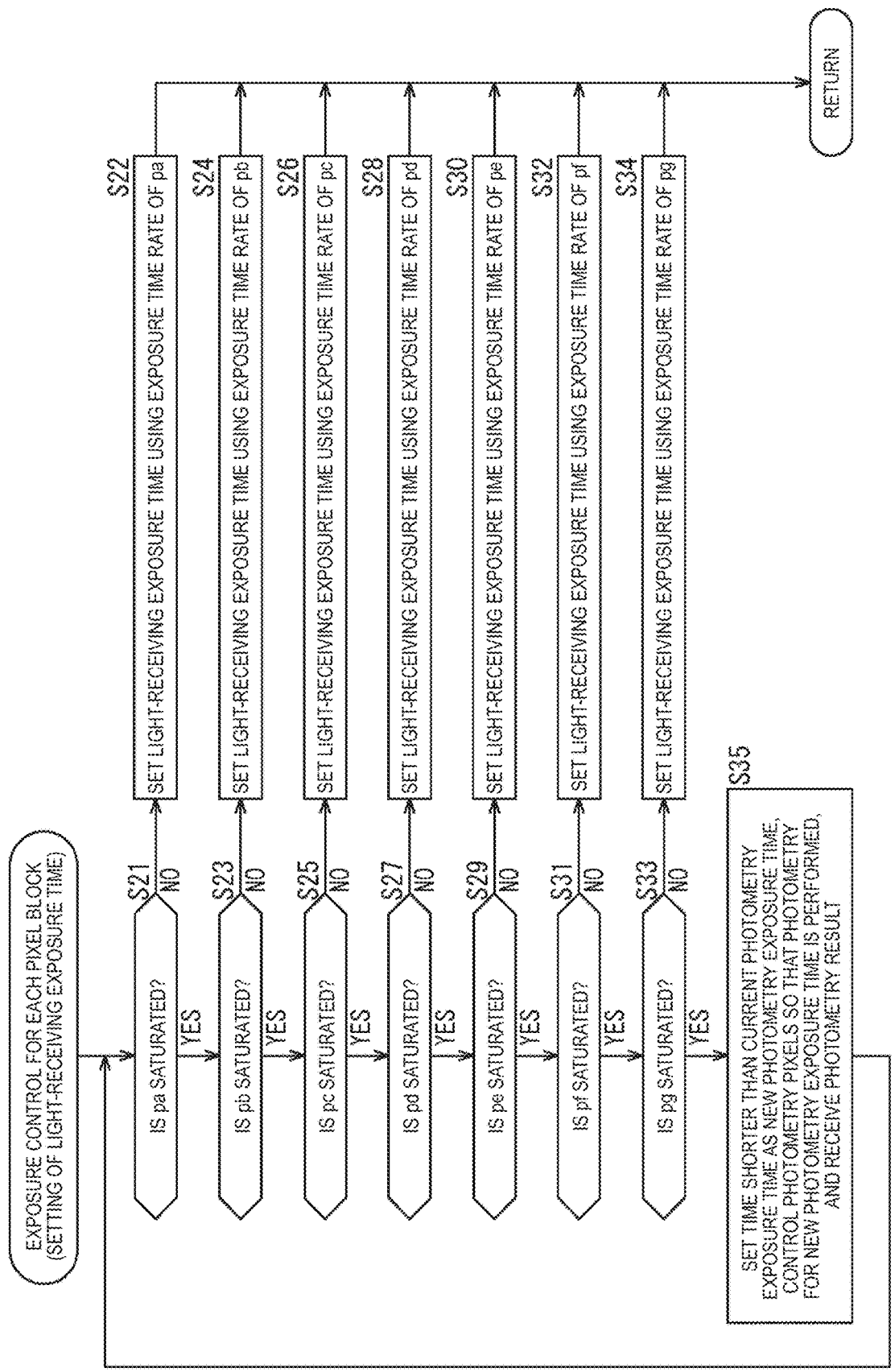
FIG. 10 is an explanatory flowchart illustrating an example of an exposure control process of suppressing saturation of the ranging pixels 21/the imaging pixels 31 by the first pixel saturation suppression method.

FIG. 10 is an explanatory flowchart illustrating an example of an exposure control process of suppressing saturation of the ranging pixels 21/the imaging pixels 31 by the first pixel saturation suppression method performed in step S13 of FIG. 9.

A process in accordance with the flowchart of FIG. 10 is performed in each pixel block. Here, the exposure control on a block of interest will be described setting a certain pixel block as the block of interest.

In step S21, the control unit 41 determines whether the photometry pixels 11 of the pixel type pa corresponding to the block of interest are saturated.

In a case in which it is determined in step S21 that the photometry pixels 11 of the pixel type pa are unsaturated, the process proceeds to step S22.

In step S22, the control unit 41 sets the light-receiving exposure time using the exposure time rate (FIG. 8) of the photometry pixels 11 of the pixel type pa, and then the process is returned. That is, the control unit 41 sets a value obtained by multiplying the exposure time rate of the photometry pixels 11 of the pixel type pa by a current photometry exposure time as the light-receiving exposure time.

In a case in which it is determined in step S21 that the photometry pixels 11 of the pixel type pa are saturated, the process proceeds to step S23, and then the control unit 41 determines whether the photometry pixels 11 of the pixel type pb corresponding to the block of interest is saturated.

In a case in which it is determined in step S23 that the photometry pixels 11 of the pixel type pb are unsaturated, the process proceeds to step S24.

In step S24, the control unit 41 sets the light-receiving exposure time using the exposure time rate of the photometry pixels 11 of the pixel type pb, and then the process is returned. That is, the control unit 41 sets a value obtained by multiplying the exposure time rate of the photometry pixels 11 of the pixel type pb by the current photometry exposure time as the light-receiving exposure time.

In a case in which it is determined in step S23 that the photometry pixels 11 of the pixel type pb are saturated, the process proceeds to step S25, and then the control unit 41 determines whether the photometry pixels 11 of the pixel type pc corresponding to the block of interest is saturated.

In a case in which it is determined in step S25 that the photometry pixels 11 of the pixel type pc are unsaturated, the process proceeds to step S26.

In step S26, the control unit 41 sets the light-receiving exposure time using the exposure time rate of the photometry pixels 11 of the pixel type pc, and then the process is returned. That is, the control unit 41 sets a value obtained by multiplying the exposure time rate of the photometry pixels 11 of the pixel type pc by the current photometry exposure time as the light-receiving exposure time.

In a case in which it is determined in step S25 that the photometry pixels 11 of the pixel type pc are saturated, the process proceeds to step S27, and then the control unit 41 determines whether the photometry pixels 11 of the pixel type pd corresponding to the block of interest is saturated.

In a case in which it is determined in step S27 that the photometry pixels 11 of the pixel type pd are unsaturated, the process proceeds to step S28.

In step S28, the control unit 41 sets the light-receiving exposure time using the exposure time rate of the photometry pixels 11 of the pixel type pd, and then the process is returned. That is, the control unit 41 sets a value obtained by multiplying the exposure time rate of the photometry pixels 11 of the pixel type pd by the current photometry exposure time as the light-receiving exposure time.

In a case in which it is determined in step S27 that the photometry pixels 11 of the pixel type pd are saturated, the process proceeds to step S29, and then the control unit 41 determines whether the photometry pixels 11 of the pixel type pe corresponding to the block of interest is saturated.

In a case in which it is determined in step S29 that the photometry pixels 11 of the pixel type pe are unsaturated, the process proceeds to step S30.

In step S30, the control unit 41 sets the light-receiving exposure time using the exposure time rate of the photometry pixels 11 of the pixel type pe, and then the process is returned. That is, the control unit 41 sets a value obtained by multiplying the exposure time rate of the photometry pixels 11 of the pixel type pe by the current photometry exposure time as the light-receiving exposure time.

In a case in which it is determined in step S29 that the photometry pixels 11 of the pixel type pe are saturated, the process proceeds to step S31, and then the control unit 41 determines whether the photometry pixels 11 of the pixel type pf corresponding to the block of interest is saturated.

In a case in which it is determined in step S31 that the photometry pixels 11 of the pixel type pf are unsaturated, the process proceeds to step S32.

In step S32, the control unit 41 sets the light-receiving exposure time using the exposure time rate of the photometry pixels 11 of the pixel type pf, and then the process is returned. That is, the control unit 41 sets a value obtained by multiplying the exposure time rate of the photometry pixels 11 of the pixel type pf by the current photometry exposure time as the light-receiving exposure time.

In a case in which it is determined in step S31 that the photometry pixels 11 of the pixel type pf are saturated, the process proceeds to step S33, and then the control unit 41 determines whether the photometry pixels 11 of the pixel type pg corresponding to the block of interest is saturated.

In a case in which it is determined in step S33 that the photometry pixels 11 of the pixel type pg are unsaturated, the process proceeds to step S34.

In step S34, the control unit 41 sets the light-receiving exposure time using the exposure time rate of the photometry pixels 11 of the pixel type pg, and then the process is returned. That is, the control unit 41 sets a value obtained by multiplying the exposure time rate of the photometry pixels 11 of the pixel type pg by the current photometry exposure time as the light-receiving exposure time.

In a case in which it is determined in step S33 that the photometry pixels 11 of the pixel type pg are saturated, the process proceeds to step S35.

In step S35, the control unit 41 sets a time shorter than the current photometry exposure time as a new photometry exposure time, controls the photometry sensor 10 such that exposure for the new photometry exposure time is performed, and receives a photometry result of the photometry pixels 11 obtained through the exposure. Then, the process returns from step S35 to step S21 and the similar processes are repeated below.

After returned from the exposure control process of FIG. 10, the light receiving pixels (the ranging pixels 21/the imaging pixels 31) are exposed for the light-receiving exposure time set in the exposure control process of FIG. 10 in step S14 of FIG. 9.

Here, as described in FIG. 7, the photometry pixels 11 can include light-shielded pixels in addition to the pixels of the pixel types pa to pg. In a case in which the light-shielded pixels are included in the photometry pixels 11, ambient light is considerably strong when a pixel value (photometry result) of the light-shielded pixels is equal to or greater than a predetermined threshold. Therefore, it is difficult to suppress the saturation of the light receiving pixels and the control unit 41 can output an error message. Alternatively, for example, in a case in which light amount decrease control can be performed to decrease the amount of light incident on the light receiving pixels, for example, by narrowing a diaphragm (not illustrated), the control unit 41 can perform the light amount decrease control.

Figure 11:
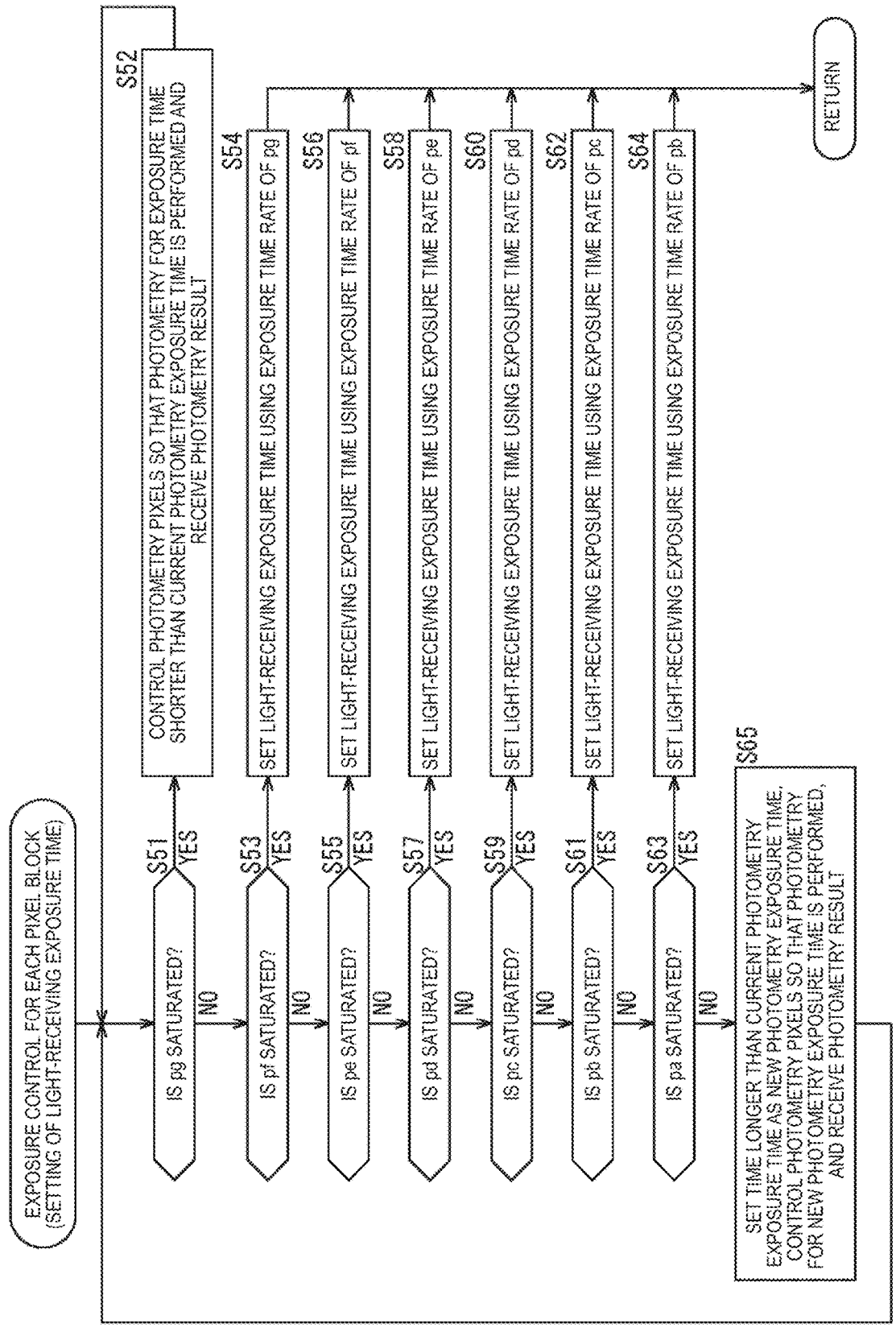
FIG. 11 is an explanatory flowchart illustrating another example of the exposure control process of suppressing saturation of the ranging pixels 21/the imaging pixels 31 by the first pixel saturation suppression method.

FIG. 11 is an explanatory flowchart illustrating another example of the exposure control process of suppressing saturation of the ranging pixels 21/the imaging pixels 31 by the first pixel saturation suppression method performed in step S13 of FIG. 9.

A process in accordance with the flowchart of FIG. 11 is performed in each pixel block. Here, the exposure control on a block of interest will be described setting a certain pixel block as the block of interest.

In step S51, the control unit 41 determines whether the photometry pixels 11 of the pixel type pg corresponding to the block of interest are saturated.

In a case in which it is determined in step S51 that the photometry pixels 11 of the pixel type pg are saturated, the process proceeds to step S52.

In step S52, the control unit 41 sets a time shorter than the current photometry exposure time as a new photometry exposure time, controls the photometry sensor 10 such that exposure for the new photometry exposure time is performed, and receives a photometry result of the photometry pixels 11 obtained through the exposure. Then, the process returns from step S52 to step S51 and the similar processes are repeated below.

Then, In a case in which it is determined in step S51 that the photometry pixels 11 of the pixel type pg are unsaturated, the process proceeds to step S53, and then the control unit 41 determines whether the photometry pixels 11 of the pixel type pf corresponding to the block of interest is saturated.

In a case in which it is determined in step S53 that the photometry pixels 11 of the pixel type pf are saturated, the process proceeds to step 54 and the control unit 41 sets the light-receiving exposure time using the exposure time rate of the photometry pixels 11 of the pixel type pg and returns the process.

In a case in which it is determined in step S53 that the photometry pixels 11 of the pixel type pf are unsaturated, the process proceeds to step S55, and then the control unit 41 determines whether the photometry pixels 11 of the pixel type pe corresponding to the block of interest is saturated.

In a case in which it is determined in step S55 that the photometry pixels 11 of the pixel type pe are saturated, the process proceeds to step 56 and the control unit 41 sets the light-receiving exposure time using the exposure time rate of the photometry pixels 11 of the pixel type pf and returns the process.

In a case in which it is determined in step S55 that the photometry pixels 11 of the pixel type pe are unsaturated, the process proceeds to step S57, and then the control unit 41 determines whether the photometry pixels 11 of the pixel type pd corresponding to the block of interest is saturated.

In a case in which it is determined in step S57 that the photometry pixels 11 of the pixel type pd are saturated, the process proceeds to step 58 and the control unit 41 sets the light-receiving exposure time using the exposure time rate of the photometry pixels 11 of the pixel type pe and returns the process.

In a case in which it is determined in step S57 that the photometry pixels 11 of the pixel type pd are unsaturated, the process proceeds to step S59, and then the control unit 41 determines whether the photometry pixels 11 of the pixel type pc corresponding to the block of interest is saturated.

In a case in which it is determined in step S59 that the photometry pixels 11 of the pixel type pc are saturated, the process proceeds to step 60 and the control unit 41 sets the light-receiving exposure time using the exposure time rate of the photometry pixels 11 of the pixel type pd and returns the process.

In a case in which it is determined in step S59 that the photometry pixels 11 of the pixel type pc are unsaturated, the process proceeds to step S61, and then the control unit 41 determines whether the photometry pixels 11 of the pixel type pb corresponding to the block of interest is saturated.

In a case in which it is determined in step S61 that the photometry pixels 11 of the pixel type pb are saturated, the process proceeds to step 62 and the control unit 41 sets the light-receiving exposure time using the exposure time rate of the photometry pixels 11 of the pixel type pc and returns the process.

In a case in which it is determined in step S61 that the photometry pixels 11 of the pixel type pb are unsaturated, the process proceeds to step S63, and then the control unit 41 determines whether the photometry pixels 11 of the pixel type pa corresponding to the block of interest is saturated.

In a case in which it is determined in step S63 that the photometry pixels 11 of the pixel type pa are saturated, the process proceeds to step 64 and the control unit 41 sets the light-receiving exposure time using the exposure time rate of the photometry pixels 11 of the pixel type pb and returns the process.

In a case in which it is determined in step S63 that the photometry pixels 11 of the pixel type pa are unsaturated, the process proceeds to step S65.

In step S65, the control unit 41 sets a time longer than the current photometry exposure time as a new photometry exposure time, controls the photometry sensor 10 such that exposure for the new photometry exposure time is performed, and receives a photometry result of the photometry pixels 11 obtained through the exposure. Then, the process returns from step S65 to step S51 and the similar processes are repeated below.

After returned from the exposure control process of FIG. 11, the light receiving pixels (the ranging pixels 21/the imaging pixels 31) are exposed for the light-receiving exposure time set in the exposure control process of FIG. 11 in step S14 of FIG. 9.

FIG. 12 is an explanatory diagram illustrating a second pixel saturation suppression method of suppressing saturation of the ranging pixels 21 and the imaging pixels 31.

In the second pixel saturation suppression method, as described in FIG. 8, it is assumed that the light receiving pixels are repeatedly exposed for a short exposure time in one frame, an exposure result of the light receiving pixels in each exposure is added, and the added value is set as a pixel value of the light receiving pixels. Then, in the second pixel saturation suppression method, an addition number which adds the exposure result of the light receiving pixels (for example, the number of exposure results to be added) is set to an appropriate value, that is, a value for suppressing the saturation of the ranging pixels 21 and the imaging pixels 31.

FIG. 12 is the similar diagram as FIG. 8 except that an addition number is written instead of the exposure time rate of FIG. 8.

As described above, in the second pixel saturation suppression method, the exposure is repeated for a short exposure time in one frame and an exposure result of the light receiving pixels in each exposure is added. However, in FIG. 12, the addition number indicates the number of exposure results to be added.

Here, when the number of exposures in one frame is N times, the N times are referred to as a reference addition number serving as a reference in FIG. 12. A value obtained by multiplying the aperture ratio of the photometry pixels 11 of the pixel types and the reference addition number N is referred to as an addition number and is associated with each pixel type.

In the first pixel saturation suppression method, as in the first pixel saturation suppression method, the exposure is first performed for the photometry exposure time. Whether each of the photometry pixels 11 of the pixel types pa to pg is in a saturated state or an unsaturated state is determined in accordance with the exposure.

Here, as illustrated in saturation pattern 1 of FIG. 12, in a case in which all the photometry pixels 11 of the pixel types pa to pg are in the unsaturated state, for example, the addition number N associated with the pixel type pa in which the aperture ratio rate is the maximum in the photometry pixels 11 in the unsaturated state is set to the number of exposure results of the light receiving pixels to be added.

As illustrated in saturation pattern 2 of FIG. 12, in a case in which the photometry pixels 11 of the pixel types pa to pc are in the saturated state and the photometry pixels 11 of the remaining pixel types pd to pg are in the unsaturated state among the pixel types pa to pg, for example, the addition number of 0.5N associated with the pixel type pd in which the aperture ratio rate is the maximum in the photometry pixels 11 in the unsaturated state is set to the number of exposure results of the light receiving pixels to be added.

Figure 13:
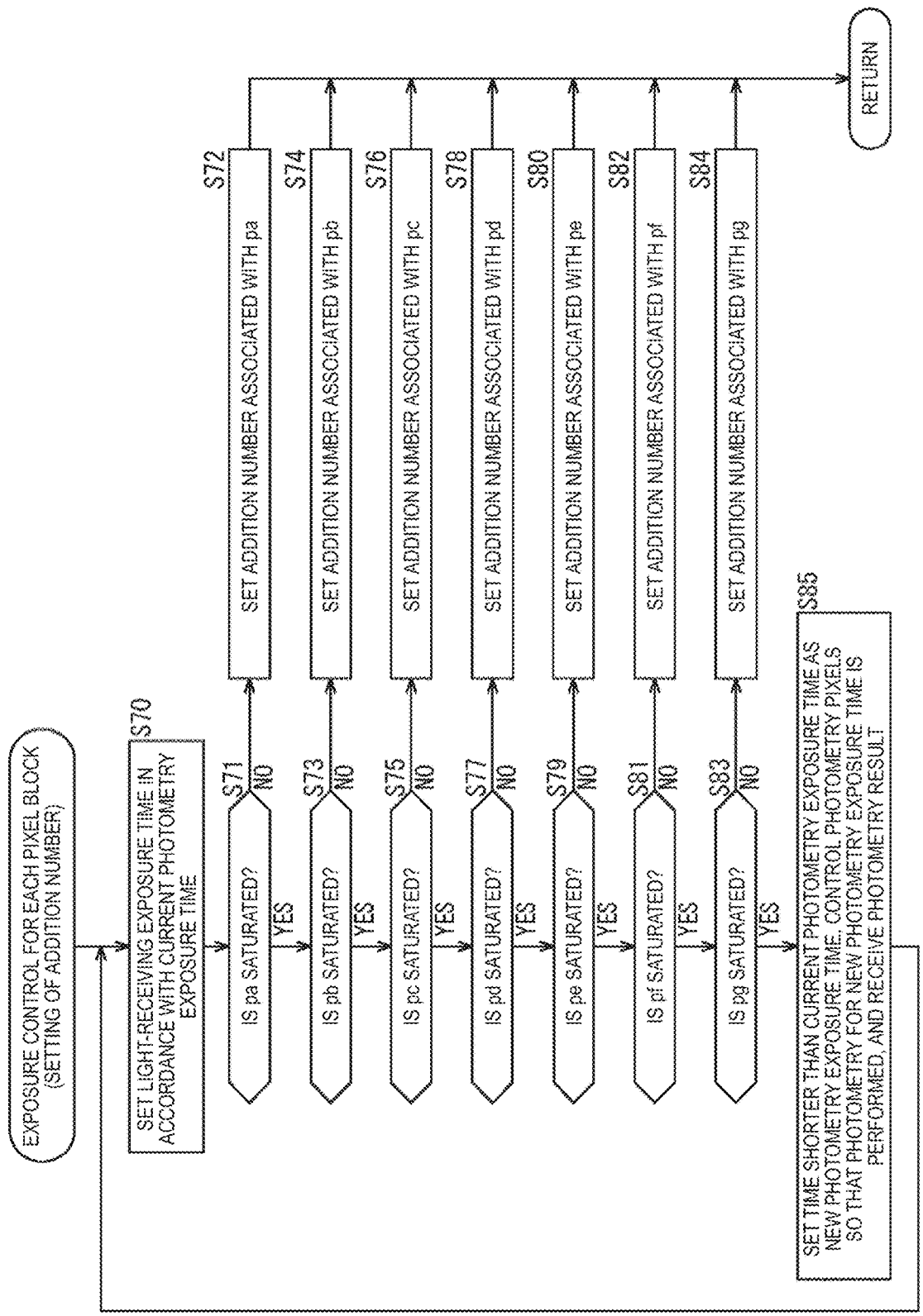
FIG. 13 is an explanatory flowchart illustrating an example of an exposure control process of suppressing saturation of light receiving pixels (the ranging pixels 21/the imaging pixels 31) by the second pixel saturation suppression method.

FIG. 13 is an explanatory flowchart illustrating an example of an exposure control process of suppressing saturation of light receiving pixels (the ranging pixels 21/the imaging pixels 31) by the second pixel saturation suppression method performed in step S13 of FIG. 9.

The process in accordance with the flowchart of FIG. 13 is performed in each pixel block. Here, the exposure control on a block of interest will be described setting a certain pixel block as the block of interest.

In step S70, for example, the control unit 41 sets a time proportional to a current photometry exposure time to a light-receiving exposure time of each exposure of the light receiving pixels repeatedly performed in one frame in accordance with the current photometry exposure time, and then the process proceeds to step S71.

In steps S71, S73, S75, S77, S79, S81, and S83, the similar determination processes as steps S21, S23, S25, S27, S29, S31, and S33 in FIG. 10 are performed.

Then, in a case in which it is determined in step S71 that the photometry pixels 11 of the pixel type pa are unsaturated, the process proceeds to step S72.

In step S72, the control unit 41 sets the addition number (FIG. 12) associated with the pixel type pa to the number of exposure results of the light receiving pixels to be added, and then the process is returned.

In a case in which it is determined in step S73 that the photometry pixels 11 of the pixel type pb are unsaturated, the process proceeds to step S74.

In step S74, the control unit 41 sets the addition number associated with the pixel type pb to the number of exposure results of the light receiving pixels to be added, and then the process is returned.

In a case in which it is determined in step S75 that the photometry pixels 11 of the pixel type pc are unsaturated, the process proceeds to step S76.

In step S76, the control unit 41 sets the addition number associated with the pixel type pc to the number of exposure results of the light receiving pixels to be added, and then the process is returned.

In a case in which it is determined in step S77 that the photometry pixels 11 of the pixel type pd are unsaturated, the process proceeds to step S78.

In step S78, the control unit 41 sets the addition number associated with the pixel type pd to the number of exposure results of the light receiving pixels to be added, and then the process is returned.

In a case in which it is determined in step S79 that the photometry pixels 11 of the pixel type pe are unsaturated, the process proceeds to step S80.

In step S80, the control unit 41 sets the addition number associated with the pixel type pe to the number of exposure results of the light receiving pixels to be added, and then the process is returned.

In a case in which it is determined in step S81 that the photometry pixels 11 of the pixel type pf are unsaturated, the process proceeds to step S82.

In step S82, the control unit 41 sets the addition number associated with the pixel type pf to the number of exposure results of the light receiving pixels to be added, and then the process is returned.

In a case in which it is determined in step S83 that the photometry pixels 11 of the pixel type pg are unsaturated, the process proceeds to step S84.

In step S84, the control unit 41 sets the addition number associated with the pixel type pg to the number of exposure results of the light receiving pixels to be added, and then the process is returned.

Moreover, in a case in which it is determined in step S83 that the photometry pixels 11 of the pixel type pg are saturated, the process proceeds to step S85.

In step S85, as in step S35 of FIG. 10, the control unit 41 sets a time shorter than the current photometry exposure time as a new photometry exposure time, controls the photometry sensor 10 such that exposure for the new photometry exposure time is performed, and receives a photometry result of the photometry pixels 11 obtained through the exposure. Then, the process returns from step S85 to step S70 and the similar processes are repeated below.

After returned from the exposure control process of FIG. 13, the light receiving pixels (the ranging pixels 21/the imaging pixels 31) are repeatedly exposed for the light-receiving exposure time in one frame in step S14 of FIG. 9. Then, the exposure result of only the addition number among the exposure results of the light receiving pixels in each exposure is added and the addition value obtained as a result is obtained as a pixel value of the light receiving pixel.

Figure 14:
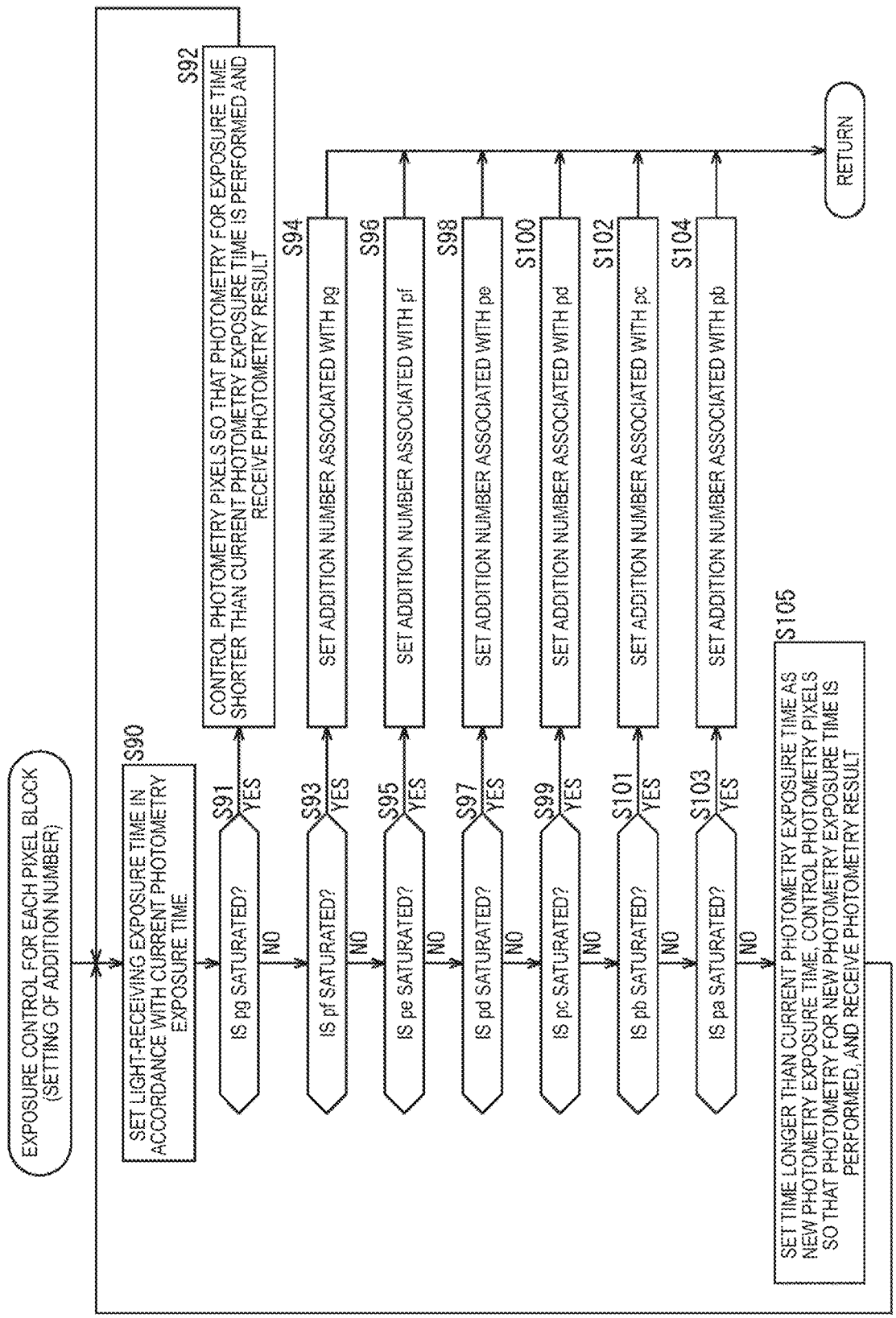
FIG. 14 is an explanatory flowchart illustrating another example of an exposure control process of suppressing saturation of the light receiving pixels by the second pixel saturation suppression method.

FIG. 14 is an explanatory flowchart illustrating another example of an exposure control process of suppressing saturation of the light receiving pixels by the second pixel saturation suppression method performed in step S13 of FIG. 9.

The process in accordance with the flowchart of FIG. 14 is performed in each pixel block. Here, the exposure control on a block of interest will be described setting a certain pixel block as the block of interest.

In step S90, the similar process as step S70 of FIG. 13 is performed and the process proceeds to step S91.

In steps S91, S93, S95, S97, S99, S101, and S103, the similar determination processes as steps S51, S53, S55, S57, S59, S61, and S63 in FIG. 11 are performed.

Then, in a case in which it is determined in step S91 that the photometry pixels 11 of the pixel type pg are saturated, the process proceeds to step S92.

In step S92, as in step S52 of FIG. 11, the control unit 41 sets a time shorter than the current photometry exposure time as a new photometry exposure time, controls the photometry sensor 10 such that exposure for the new photometry exposure time is performed, and receives a photometry result of the photometry pixels 11 obtained through the exposure. Then, the process returns from step S92 to step S90 and the similar processes are repeated below.

In a case in which it is determined in step S93 that the photometry pixels 11 of the pixel type pf are saturated, the process proceeds to step S94 and the control unit 41 sets the addition number associated with the pixel type pg to the number of exposure results of the light receiving pixels to be added, and then the process is returned.

In a case in which it is determined in step S95 that the photometry pixels 11 of the pixel type pe are saturated, the process proceeds to step S96 and the control unit 41 sets the addition number associated with the pixel type pf to the number of exposure results of the light receiving pixels to be added, and then the process is returned.

In a case in which it is determined in step S97 that the photometry pixels 11 of the pixel type pd are saturated, the process proceeds to step S98 and the control unit 41 sets the addition number associated with the pixel type pe to the number of exposure results of the light receiving pixels to be added, and then the process is returned.

In a case in which it is determined in step S99 that the photometry pixels 11 of the pixel type pc are saturated, the process proceeds to step S100 and the control unit 41 sets the addition number associated with the pixel type pd to the number of exposure results of the light receiving pixels to be added, and then the process is returned.

In a case in which it is determined in step S101 that the photometry pixels 11 of the pixel type pb are saturated, the process proceeds to step S102 and the control unit 41 sets the addition number associated with the pixel type pc to the number of exposure results of the light receiving pixels to be added, and then the process is returned.

In a case in which it is determined in step S103 that the photometry pixels 11 of the pixel type pa are saturated, the process proceeds to step S104 and the control unit 41 sets the addition number associated with the pixel type pb to the number of exposure results of the light receiving pixels to be added, and then the process is returned.

In a case in which it is determined in step S103 that the photometry pixels 11 of the pixel type pa are unsaturated, the process proceeds to step S105.

In step S105, as in step S65 of FIG. 11, the control unit 41 sets a time longer than the current photometry exposure time as a new photometry exposure time, controls the photometry sensor 10 such that exposure for the new photometry exposure time is performed, and receives a photometry result of the photometry pixels 11 obtained through the exposure. Then, the process returns from step S105 to step S90 and the similar processes are repeated below.

After returned from the exposure control process of FIG. 14, the light receiving pixels (the ranging pixels 21/the imaging pixels 31) are repeatedly exposed for the light-receiving exposure time in one frame in step S14 of FIG. 9. Then, the exposure result of only the addition number among the exposure results of the light receiving pixels in each exposure is added and the addition value obtained as a result is obtained as a pixel value of the light receiving pixel.

<Digital Camera as Electronic Apparatus to which the Present Technology is Applied>

Figure 15:
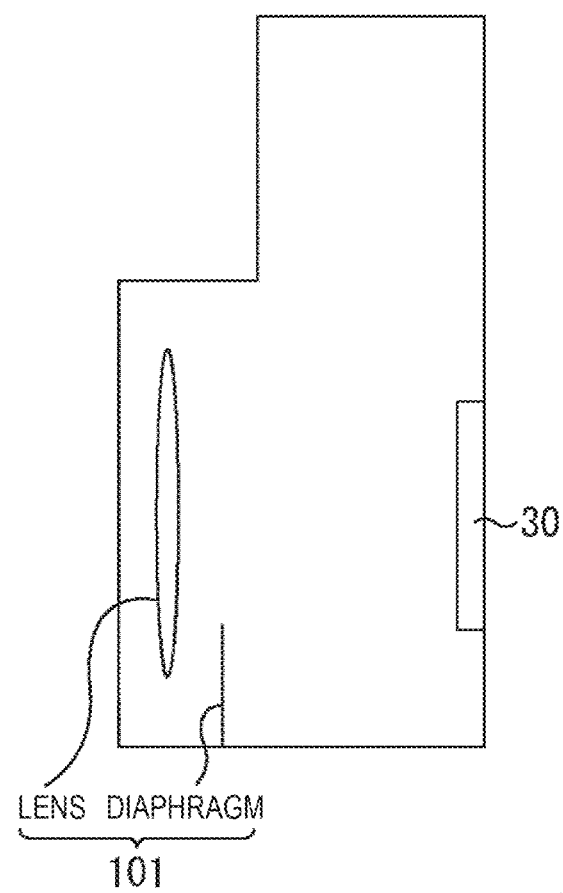
FIG. 15 is a sectional view illustrating an overview of a first configuration example of a digital camera to which the present technology is applied.

FIG. 15 is a side sectional view illustrating an overview of a first configuration example of a digital camera to which the present technology is applied.

Here, the ranging sensor 20 which is a ToF sensor can perform a high-speed operation in which exposure can be performed for a short time of a nanosecond level. Therefore, even when the light receiving surface of the ranging sensor 20 is exposure en bloc (the entire light receiving surface is exposed), an exposure time can be controlled for each pixel block.

Incidentally, as the image sensor 30, for example, complemental metal oxide semiconductor (CMOS) image sensor can be adopted.

As the CMOS image sensor, there is a first image sensor in which a light receiving surface including pixels and a driver circuit (and other peripheral circuits) driving the pixels are formed on the same substrate.

In the first image sensor, a driving signal line for driving the pixels lines in one row is disposed in each row (the pixels of each row) in, for example, the horizontal direction of the light receiving surface and the driver circuit is disposed, for example, at a position adjacent to the right or left of the light receiving surface on a substrate on which the light receiving surface is formed.

Then, in the first image sensor, signals are read in parallel for each row from the pixels of each column lined in the row by driving the pixels lined in one row via the driving signal lines from the driver circuit.

A time constant of the first image sensor is ruled by the size of the light receiving surface (an area in which the pixels are disposed). Therefore, it is difficult to cause the first image sensor to operate at a high speed as in the ranging sensor 20 which is a ToF sensor and control an exposure time for each pixel block.

As a method of causing the first image sensor to operate at a high speed, for example, there is a method of shortly segmenting the driving signal line disposed in each row to minify the time constant.

However, in a case in which the driving signal line disposed in each row is shortly segmented in the first image sensor in which the driver circuit is disposed at a position adjacent to the light receiving surface, it is necessary to install a driver circuit (or a buffer) that drive the pixels connected to the segmented driving signal lines at positions at which the driving signal line is segmented in the light receiving surface. As a result, the size of the light receiving surface and further the image sensor becomes large.

Accordingly, as the image sensor 30, a second (CMOS) image sensor can be adopted rather than the first image sensor.

The second image sensor has a stacked structure in which at least two substrates, a pixel substrate which is a substrate including a light receiving surface including pixels and a circuit substrate which is a substrate in which a driver circuit driving the pixels on the light receiving surface is formed, are stacked and the substrates are electrically connected to each other.

Since the second image sensor has the foregoing stacked structure, the segmented driving signal lines of the pixel substrate can be connected to the driver circuit of the circuit substrate at positions at which the driving signal line is segmented by short wirings in a direction orthogonal to the light receiving surface.

Accordingly, in the second image sensor, the time constant can be minified and a high-speed operation can be performed without installing driver circuits driving the pixels connected to the segmented driving signal lines at the positions at which the driving signal line is segmented in the light receiving surface as in the first image sensor.

As a result, in the second image sensor, it is possible to perform exposure for a short time and control an exposure time for each pixel block as in the ranging sensor 20 which is a ToF sensor.

As the image sensor 30, for example, the foregoing second image sensor can be adopted.

By adopting the second image sensor as the image sensor 30, it is possible to control the exposure time for each pixel block of one frame. Thus, as described in FIG. 8, it is possible to magnify the dynamic range of an image including a pixel value of the imaging pixels 31 of the image sensor 30.

In FIG. 15, the digital camera is, for example, a digital camera to which the light receiving device in FIG. 3 is applied and includes the image sensor 30 and an optical system 101.

The optical system 101 includes a lens or a diaphragm and condenses light from a subject on the light receiving surface of the image sensor 30.

In FIG. 15, the image sensor 30 is, for example, an image sensor that also serves as the photometry sensor 10, as described in FIG. 5, and performs photometry and imaging by receiving light from the optical system 101.

In the digital camera in FIG. 15, the control unit 41 (not illustrated in FIG. 15) controls the photometry pixels 11 of each pixel block (FIG. 5) of the image sensor 30 such that the exposure for the photometry exposure time is performed. The photometry pixels 11 receive light only for the photometry exposure time and perform photometry under the control of the control unit 41.

The control unit 41 acquires a photometry result obtained when the photometry pixels 11 perform the photometry and performs the exposure control on the imaging pixels 31 of the pixel block in accordance with the photometry result of each pixel block.

The imaging pixels 31 of each pixel block of the image sensor 30 receive light and perform imaging through the exposure under the exposure control of the control unit 41, and output a pixel value in accordance with the amount of light.

When the exposure control on the imaging pixels 31 of the pixel block is performed in accordance with the photometry result of the pixel block (the same applies to the exposure control of the ranging pixels 21), it is necessary to specify the photometry result of each pixel block from the photometry result of the photometry sensor 10. This is because the exposure control of the imaging pixels 31 of the pixel block is performed in accordance with the photometry result of the pixel block.

As a method of specifying the photometry result of the pixel block, there is a method of receiving the same light as the light received by the image sensor 30 by the photometry sensor 10, that is, a method of receiving the same light between the photometry sensor 10 and the image sensor 30.

Moreover, as the method of specifying the photometry result of the pixel block, there is a method of performing alignment calibration to be described below in a case in which the photometry sensor 10 receives light (slightly) different from light received by the image sensor 30.

In the digital camera in FIG. 15, the image sensor 30 also serves as the photometry sensor 10. Therefore, both the photometry sensor 10 and the image sensor 30 receive the same light that has passed through the optical system 101.

Here, it is assumed that an image in which an imaging result of the imaging pixels 31 of the image sensor 30 is set with a pixel value is referred to as a captured image, and an image in which a photometry result of the photometry pixels 11 of the photometry sensor 10 is set with a pixel value is referred to as a photometry image. Moreover, to facilitate the description, the pixel blocks described in FIG. 5 are introduced to the captured image.

In a case in which the photometry sensor 10 and the image sensor 30 receive the same light that has passed through the optical system 101, a photometry result set with a pixel value in an area (an area identical to a block of interest in a case in which a captured image and a photometry image have the same size) corresponding to the block of interest of the photometry image can be specified as a photometry result of the block of interest among the pixel blocks of the captured image.

A case in which the photometry sensor 10 and the image sensor 30 receive the same light includes not only the case in which the photometry sensor 10 and the image sensor 30 receive the same light that has passed through the same optical system such as the optical system 101, but also, for example, a case in which light is incident and the light reflected, refracted, or partitioned by an optical component such as a mirror or a prism is received and a case in which one of the pieces of light received by the photometry sensor 10 and the image sensor 30 goes through a unique optical component.

Figure 16:
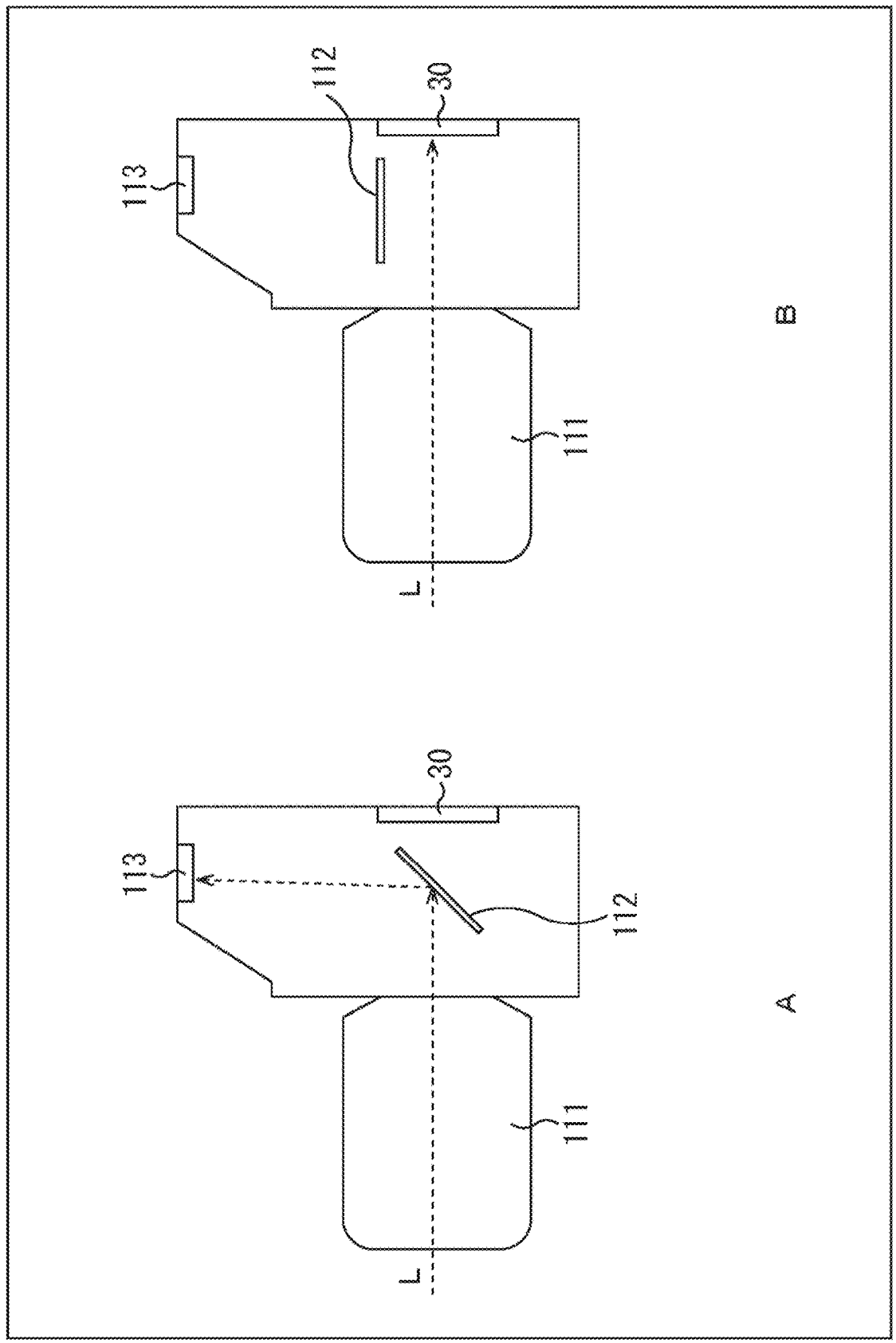
FIG. 16 is a sectional view illustrating an overview of a second configuration example of a digital camera to which the present technology is applied.

FIG. 16 is a sectional view illustrating an overview of a second configuration example of the digital camera to which the present technology is applied.

In FIG. 16, a digital camera is, for example, a single-lens digital camera to which the light receiving device in FIG. 3 is applied and includes the image sensor 30, an optical system 111, a movable mirror 112, and an electric view finder (EVF) sensor 113.

The optical system 111 includes a lens or a diaphragm (not illustrated) and condenses light L from a subject.

The movable mirror 112 is a mirror with a flat plate shape. When imaging is not performed in the image sensor 30, the movable mirror 112 is at an attitude that is sloped upward right, as illustrated in A of FIG. 16 and reflects light that has passed through the optical system 111 to the upper side of the digital camera.

Moreover, when imaging is performed in the image sensor 30, the movable mirror 112 is at an attitude that is horizontal, as illustrated in B of FIG. 16, and causes light that has passed through the optical system 111 to be incident on the image sensor 30.

When a release button (not illustrated) is manipulated, the movable mirror 112 takes the attitude that is horizontal, as illustrated in B of FIG. 16. When the release button is not manipulated, the movable mirror 112 take the attitude that is sloped upward right, as illustrated in A of FIG. 16.

The EVF sensor 113 captures an EVF image to be displayed with an EVF (not illustrated) by receiving light reflected from the movable mirror 112.

The EVF sensor 113 is an image sensor that also serves as the photometry sensor 10 and performs photometry in addition to capturing an EVF image by receiving light reflected from the movable mirror 112.

In FIG. 16, the image sensor 30 is an image sensor that does not serve as the photometry sensor 10. In a case in which the release button is manipulated, the image sensor 30 performs imaging by receiving light from the optical system 111.

In the digital camera in FIG. 16, when the release button is not manipulated, as illustrated in A of FIG. 16, the movable mirror 112 takes the attitude that is sloped upward right, and light that has passed through the optical system 111 is reflected from the movable mirror 112 and is incident on the EVF sensor 113 that also serves as the photometry sensor 10.

The control unit 41 (not illustrated in FIG. 16) controls the EVF sensor 113 that also serves as the photometry sensor such that exposure for a photometry exposure time is performed (the light reflected from the movable mirror 112 is allowed to be received) 10 and acquires a photometry result of the photometry performed through the exposure.

Thereafter, when the release button is manipulated, the control unit 41 performs the exposure control on the imaging pixels 31 of the pixel block in accordance with a recent photometry result of each pixel block.

When the release button is manipulated, as illustrated in B of FIG. 16, the movable mirror 112 takes the attitude that is horizontal and the light that has passed through the optical system 111 is incident on the image sensor 30.

The imaging pixels 31 of each pixel block of the image sensor 30 receive the light that has passed through the optical system 111 and perform imaging through exposure under the exposure control of the control unit 41, and output a pixel value in accordance with the amount of light.

Figure 17:
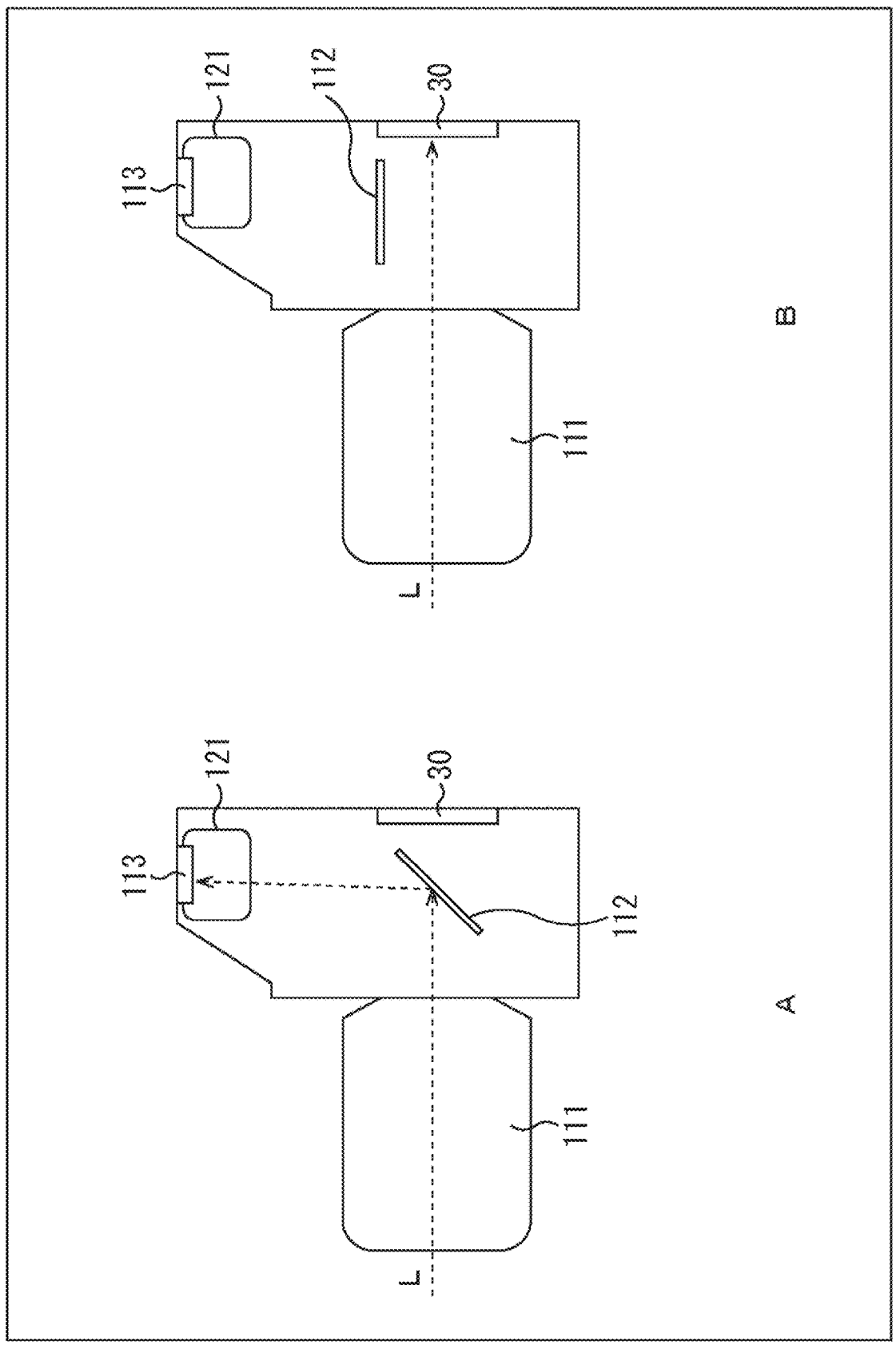
FIG. 17 is a sectional view illustrating an overview of a third configuration example of a digital camera to which the present technology is applied.

FIG. 17 is a sectional view illustrating an overview of a third configuration example of the digital camera to which the present technology is applied.

Additionally, the same reference numerals are given to portions corresponding to the case of FIG. 16 and the description thereof will be appropriately omitted below.

In FIG. 17, the digital camera includes the image sensor 30, the optical system 111, the movable mirror 112, the EVF sensor 113, and an EVF optical system 121.

Accordingly, the digital camera in FIG. 17 is common to the case of FIG. 16 in that the image sensor 30, the optical system 111, the movable mirror 112, and the EVF sensor 113 are included, and is different from the case of FIG. 16 in that the EVF optical system 121 is newly installed.

The EVF optical system 121 is, for example, a unique optical component such as an optical filter or a lens to the EFV sensor 113 and is installed on a side of the EVF sensor 113 on which light is incident.

Accordingly, the EVF sensor 113 receives light that has passed (gone) through the EVF optical system 121.

Other operations of the digital camera in FIG. 17 are the same as the case of FIG. 16 and the description thereof will be omitted.

Figure 18:
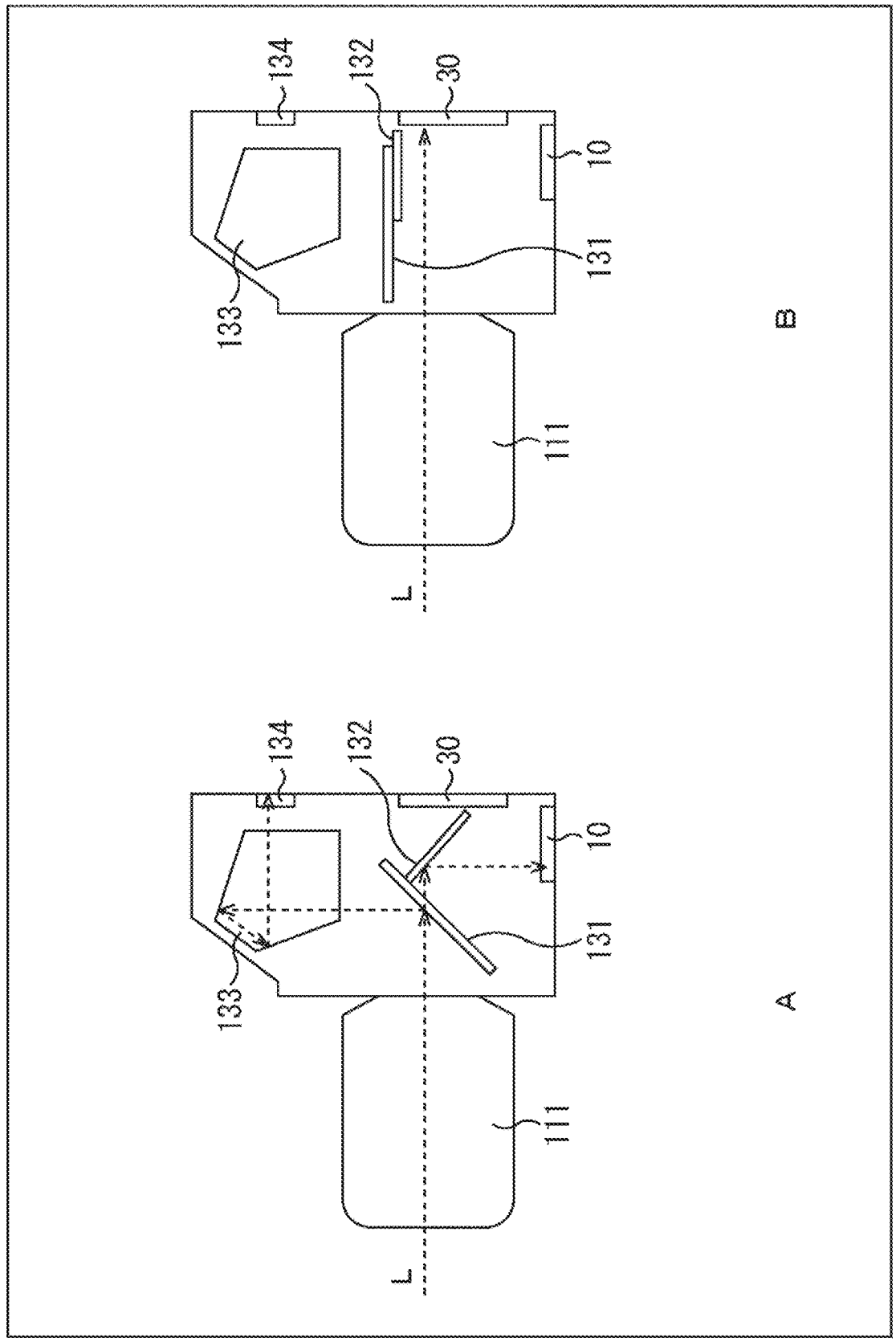
FIG. 18 is a sectional view illustrating an overview of a fourth configuration example of a digital camera to which the present technology is applied.

FIG. 18 is a sectional view illustrating an overview of a fourth configuration example of the digital camera to which the present technology is applied.

Additionally, the same reference numerals are given to portions corresponding to the case of FIG. 16 and the description thereof will be appropriately omitted below.

In FIG. 18, the digital camera includes the photometry sensor 10, the image sensor 30, the optical system 111, a movable half mirror 131, a movable mirror 132, a pentaprism 133, and a viewfinder 134.

Accordingly, the digital camera in FIG. 18 is common to the case of FIG. 16 in that the image sensor 30 and the optical system 111 are included.

However, the digital camera in FIG. 18 is different from the case of FIG. 16 in that the movable mirror 112 and the EVF sensor 113 are not included and the movable half mirror 131, the movable mirror 132, the pentaprism 133, and the viewfinder 134 are included.

The movable half mirror 131 is a half mirror with a flat plate shape. When imaging is not performed in the image sensor 30, the movable half mirror 131 takes an attitude that is sloped upward right, as illustrated in A of FIG. 18, and reflects a part of light that has passed through the optical system 111 to the upper side of the digital camera and causes the remaining light to pass.

Moreover, when imaging is performed in the image sensor 30, the movable half mirror 131 takes an attitude that is horizontal along with the movable mirror 132, as illustrated in B of FIG. 18, and allows the light that has passed through the optical system 111 to be incident on the image sensor 30.

When a release button (not illustrated) is manipulated, the movable half mirror 131 takes the attitude that is horizontal, as illustrated in B of FIG. 18. When the release button is not manipulated, the movable half mirror 131 takes the attitude that is sloped upward right, as illustrated in A of FIG. 18.

The movable mirror 132 is a mirror with a flat plate shape. When imaging is not performed in the image sensor 30, the movable mirror 132 takes an attitude that is sloped upward left, as illustrated in A of FIG. 18, and reflects light that has passed through the movable half mirror 131 to the lower side of the digital camera and allows the light to be incident on the photometry sensor 10.

Moreover, when imaging is performed in the image sensor 30, the movable mirror 132 takes an attitude that is horizontal along with the movable half mirror 131, as illustrated in B of FIG. 18, and allows the light that has passed through the optical system 111 to be incident on the image sensor 30.

When the release button (not illustrated) is manipulated, the movable mirror 132 takes the attitude that is horizontal, as illustrated in B of FIG. 18. When the release button is not manipulated, the movable mirror 132 takes the attitude that is sloped upward left, as illustrated in A of FIG. 18.

The pentaprism 133 appropriately reflects the light reflected from the movable half mirror 131 and allows the light to exit to the viewfinder 134.

The light from the pentaprism 133 is incident on the viewfinder 134. Thus, when a user looks into the viewfinder 134, the user can confirm a figure (image) captured by the image sensor 30.

Here, in FIG. 18, the image sensor 30 is an image sensor that does not serve as the photometry sensor 10, as described in FIG. 16.

When the release button is not manipulated in the digital camera in FIG. 18, as illustrated in A of FIG. 18, the movable half mirror 131 takes the attitude that is sloped upward right and the movable mirror 132 takes the attitude that is sloped upward left.

As a result, a part of the light that has passed through the optical system 111 passes through the movable half mirror 131 and the remaining light is reflected from the movable half mirror 131.

The light reflected from the movable half mirror 131 is further reflected from the pentaprism 133 to be incident on the viewfinder 134.

On the other hand, the light that has passed through the movable half mirror 131 is reflected by the movable mirror 132 to be incident on the photometry sensor 10.

The control unit 41 (not illustrated in FIG. 18) controls the EVF sensor 113 that also serves as the photometry sensor 10 such that the exposure is performed for the photometry exposure time (the light reflected from the movable mirror 132 is caused to be received), and acquires a photometry result of the photometry performed through the exposure.

Thereafter, when the release button is manipulated, the control unit 41 performs the exposure control of the imaging pixels 31 of the pixel block in accordance with a recent photometry result of each pixel block.

When the release button is manipulated, as illustrated in B of FIG. 18, the movable half mirror 131 and the movable mirror 132 take the attitude that is horizontal, and thus the light that has passed through the optical system 111 is incident on the image sensor 30.

The imaging pixels 31 of each pixel block of the image sensor 30 receive light that has passed through the optical system 111 and perform imaging through the exposure under the exposure control of the control unit 41, and output a pixel value in accordance with the amount of light.

A case in which the photometry sensor 10 (the EVF sensor 113 that also serves as the photometry sensor 10) and the image sensor 30 receive the same light includes not only, for example, the case in which the image sensor 30 also serves the photometry sensor 10, as in the digital camera in FIG. 15, but also, for example, a case in which the photometry sensor 10 (the EVF sensor 113 that also serves as the photometry sensor 10) receives the light reflected from the movable mirror 112 in the light L incident on the optical system 111 as in the digital camera in FIGS. 16 to 18, the case in which the light that has passed through the movable half mirror 131 and reflected from the movable mirror 132 is received, and the case in which the light received by the photometry sensor 10 (the EVF sensor 113 that also serves as the photometry sensor 10) goes through the EVF optical system 121 serving as a unique optical component.

Moreover, not only can the image sensor 30 also serve as the photometry sensor 10, but the EVF sensor 113 can also serve as the photometry sensor 10. That is, the EVF sensor 113 can serve as the photometry sensor 10.

Figure 19:
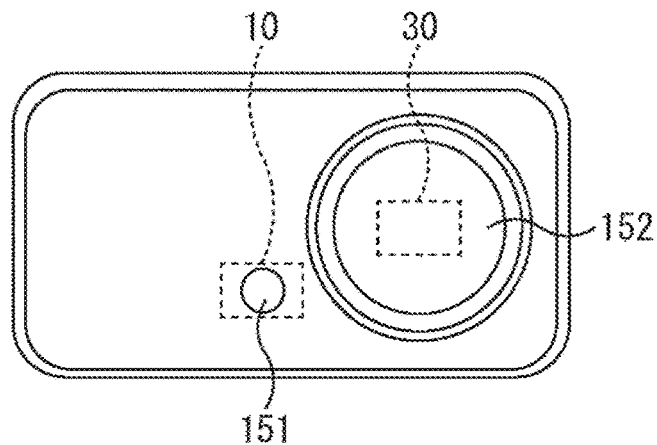
FIG. 19 is a plan view illustrating an overview of a fifth configuration example of the digital camera to which the present technology is applied.

FIG. 19 is a plan view illustrating an overview of a fifth configuration example of the digital camera to which the present technology is applied.

In FIG. 19, the digital camera is, for example, a digital camera to which the light receiving device in FIG. 3 is applied and includes the photometry sensor 10, the image sensor 30, a photometry optical system 151, and an imaging optical system 152.

The photometry optical system 151 includes a lens or a diaphragm (not illustrated) and condenses light from a subject on the photometry sensor 10.

The imaging optical system 152 includes a lens or a diaphragm (not illustrated) and condenses light from a subject on the image sensor 30.

The photometry optical system 151 and the imaging optical system 152 are physically different optical systems.

In the digital camera in FIG. 19, the photometry sensor 10 receives light that has passed through the photometry optical system 151 and perform photometry, and the image sensor 30 receives the light that has passed through the imaging optical system 152 and performs imaging.

The control unit 41 (not illustrated in FIG. 19) controls the photometry sensor 10 such that exposure for a photometry exposure time is performed (the light that has passed through the photometry optical system 151 is allowed to be received) and acquires a photometry result of the photometry performed through the exposure.

Then, the control unit 41 performs the exposure control of the imaging pixels 31 of the pixel block in accordance with a photometry result of each pixel block.

The imaging pixels 31 of each pixel block of the image sensor 30 receive the light that has passed through the imaging optical system 152 and perform imaging through exposure under the exposure control of the control unit 41, and output a pixel value in accordance with the amount of light.

Here, in the digital camera in FIG. 19, the photometry sensor 10 receives the light that has passed through the photometry optical system 151 and the image sensor 30 receives light that has passed through the imaging optical system 152 physically different from the photometry optical system 151.

Since the photometry optical system 151 and the imaging optical system 152 are physically different, the photometry optical system 151 and the imaging optical system 152 are not disposed at the same position, but are disposed at deviated positions.

Accordingly, light received by the photometry sensor 10 and light received by the image sensor 30 are (slightly) different. Therefore, a photometry result which is a pixel value in an area corresponding to a block of interest (a pixel block of interest) of a photometry image obtained from the photometry sensor 10 does not become a photometry result of the block of interest.

Therefore, in the digital camera in FIG. 19, alignment calibration can be performed on a photometry image obtained by the photometry sensor 10 and a captured image obtained by the image sensor 30 so that positions at which the same subject is shown correspond to each other.

Figure 20:
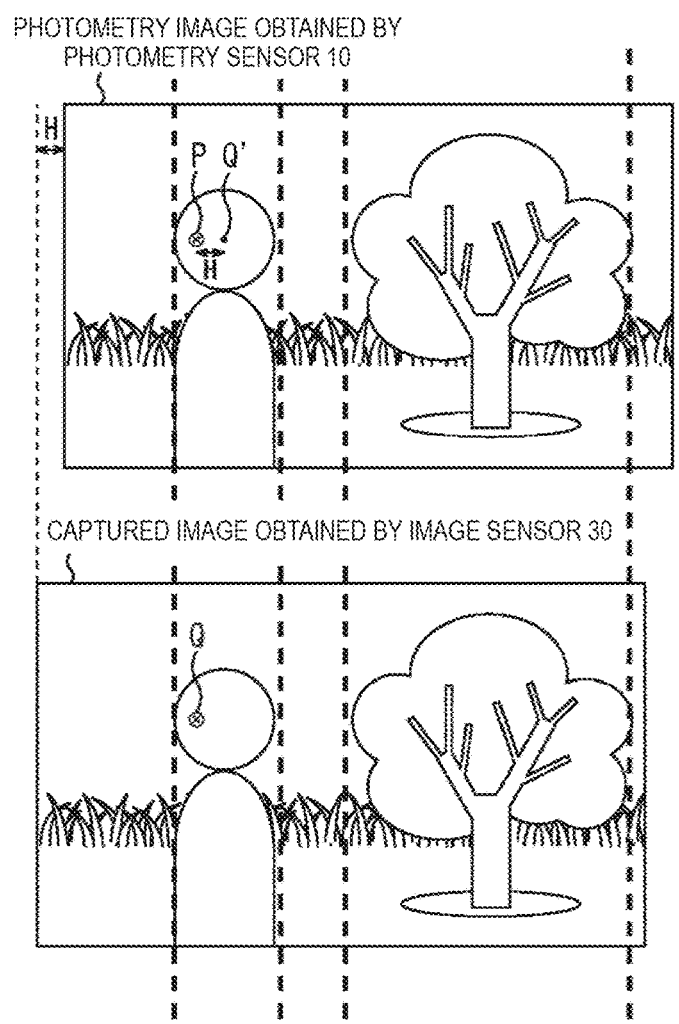
FIG. 20 is an explanatory diagram illustrating alignment calibration.

FIG. 20 is an explanatory diagram illustrating alignment calibration.

That is, FIG. 20 illustrates examples of a photometry image obtained by the photometry sensor 10 and a captured image obtained by the image sensor 30.

In the digital camera in FIG. 19, light received by the photometry sensor 10 is different from light received by the image sensor 30. Therefore, a photometry result which becomes a pixel value of an area deviated from an area corresponding to a block of interest of the photometry image by the difference becomes a photometry result of the block of interest.

That is, in a case in which the light received by the photometry sensor 10 matches the light received by the image sensor 30, a position P of the photometry image at which a certain subject X is shown corresponds to (is at the same position as) a position Q of the captured image at which the subject X is shown.

However, in a case in which the light received by the photometry sensor 10 and the light received by the image sensor 30 are different from each other, the position P of the photometry image at which the subject X is shown does not match a position Q' of the photometry image corresponding to the position Q of the captured image at which the subject X is shown.

That is, in a case in which a deviation of H pixels in the horizontal direction occurs between the photometry image and the captured image due to the difference between the light received by the photometry sensor 10 and the light received by the image sensor 30, the subject X is not shown at the position (hereinafter also referred to as a correspondence position) Q' of the photometry image corresponding to the position Q of the captured image at which the subject X is shown. In the photometry image, the subject X is shown at the position P deviated by the H pixels from the correspondence position Q' in the horizontal direction.

For this reason, in the alignment calibration, calibration is performed so that the position P of the photometry image at which the subject X is shown corresponds to (is at the same position as) the position Q of the captured image at which the subject X is shown.

As the alignment calibration, there are software calibration and mechanical calibration.

In the software calibration, one or both of the captured image and the photometry image are subjected to image processing using information (lens information or the like) of the photometry optical system 151 or the imaging optical system 152 as necessary so that the positions of the photometry image and the captured image in which the same subject is shown match each other.

In the mechanical calibration, a positional relation between the photometry optical system 151 and the photometry sensor 10, a positional relation between the imaging optical system 152 and the image sensor 30, attitudes of the photometry sensor 10, the image sensor 30, the photometry optical system 151, and the imaging optical system 152, or the like are adjusted so that the positions of the photometry image and the captured image in which the same subject is shown match each other.

As the alignment calibration, one or both of the software calibration and the mechanical calibration can be performed.

By causing the position P of the photometry image at which the subject X is shown to correspond to the position Q of the captured image at which the subject X is shown by performing the alignment calibration, a photometry result of each pixel block can be specified and the exposure control on the imaging pixels 31 of the pixel block can be performed in accordance with the photometry result of the pixel block.

As a result, it is possible to suppress the saturation of the imaging pixels 31 and further magnify the dynamic range of a captured image including a pixel value of the imaging pixels 31 of the image sensor 30, as described in FIG. 8.

Additionally, the light receiving device in FIGS. 1 to 3 can be applied not only to a digital camera but also to any electronic apparatus with an imaging function, any electronic apparatus with a ranging function, and any other electronic apparatus that receives light and performs a process.

<Description of Computer to which the Present Technology is Applied>

Next, series of processes of the control unit 41 above-described can be performed by hardware or may also be performed by software. When the series of processes is performed by software, a program configuring the software is installed in a microcomputer or the like.

Figure 21:
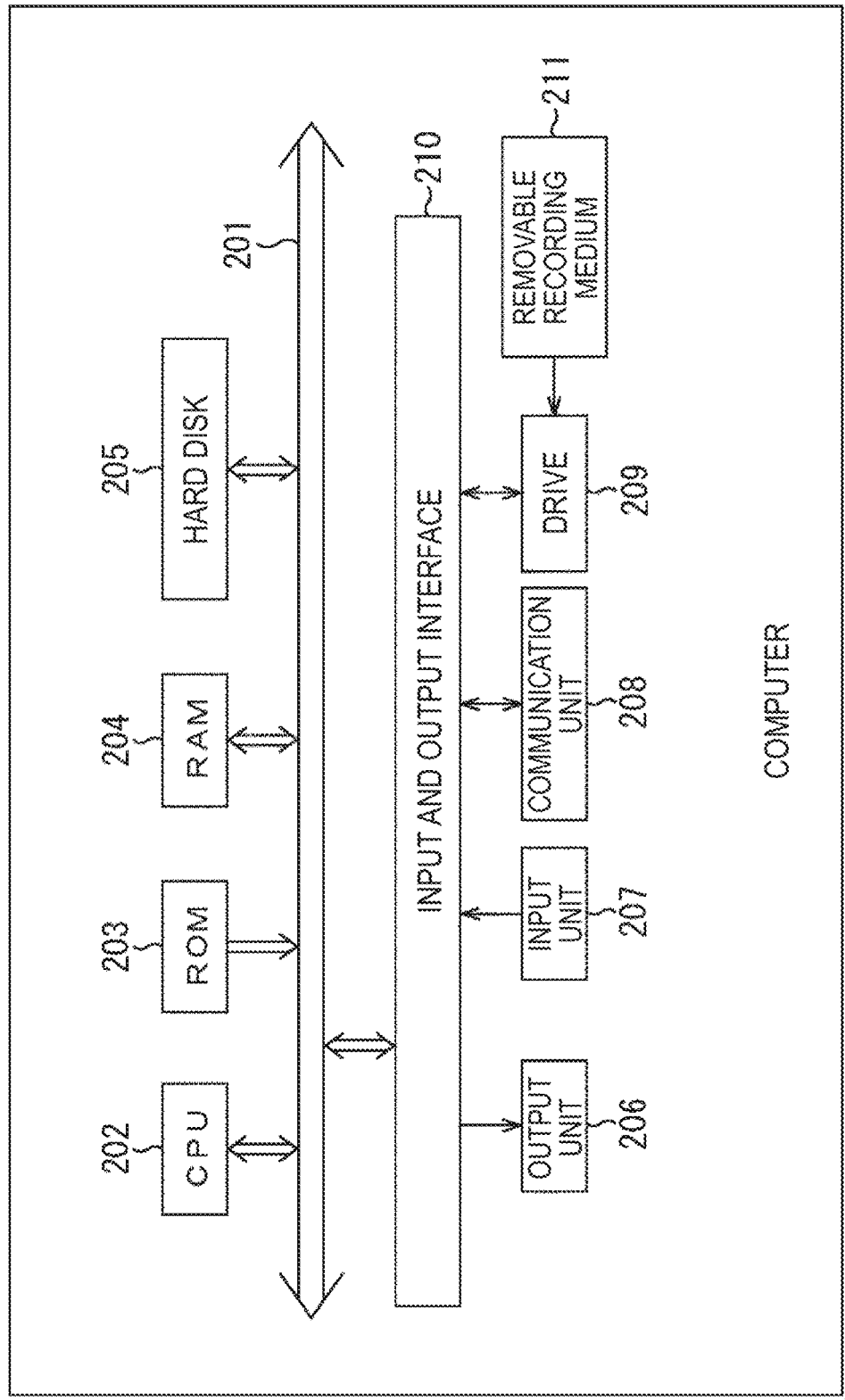
FIG. 21 is a block diagram illustrating a configuration example of an embodiment of a computer to which the present technology is applied.

Thus, FIG. 21 is a block diagram illustrating a configuration example of an embodiment of a computer in which a program executing the above-described series of processes is installed.

The program can be recorded in advance in a ROM 203 or a hard disk 205 serving as a recording medium built in the computer.

Alternatively, the program can be stored (recorded) in a removable recording medium 211. The removable recording medium 211 can be provided as so-called package software. Here, examples of the removable recording medium 211 include a flexible disk, a compact disc read-only memory (CD-ROM) disc, a magneto-optical (MO) disc, a digital versatile disc (DVD), a magnetic disk, a semiconductor memory and the like.

Additionally, the program can be installed in the computer from the above-described removable recording medium 211 and can also be downloaded to the computer via a communication network or a broadcasting network and installed in the built-in hard disk 205. That is, the program can be transferred from a download site, for example, in a wireless manner to the computer via a digital satellite broadcasting artificial satellite or in a wired manner to the computer via a network such as a local area network (LAN) or the Internet.

The computer includes a built-in central processing unit (CPU) 202. An input and output interface 210 is connected to the CPU 202 via a bus 201.

When a user inputs an instruction by manipulating an input unit 207 via the input and output interface 210, the CPU 202 accordingly executes the program stored in the read-only memory (ROM) 203. Alternatively, the CPU 202 loads the program stored in the hard disk 205 to a random access memory (RAM) 204 and executes the program.

Thus, the CPU 202 performs a process according to the above-described flowchart or a process performed by the configuration of the above-described block diagram. Then, the CPU 202 causes an output unit 206 to output the processing result, causes a communication unit 208 to transmit the processing result, then, causes the hard disk 205 to record the processing result or causes any other processes as necessary, via the input and output interface 210, for example.

The input unit 207 includes a keyboard, a mouse, and a microphone. The output unit 206 includes a liquid crystal display (LCD) or a speaker.

Here, in this specification, the processing steps executed by a computer in accordance with a program do not always have to be executed in a time-sequential manner in the order described as the flowchart. That is, processing executed by the computer in accordance with the program includes processing in a parallel or discrete manner (for example, parallel processing or object-based processing).

Furthermore, with regard to the program, processing may be carried out by one computer (one processor), or processing may be carried out in a distributed manner by a plurality of computers. In addition, the program may be transferred to a remote computer and executed.

Further, in this specification, a system has the meaning of a set of a plurality of structural elements (such as an apparatus or a module (part)), and does not take into account whether or not all the structural elements are in the same casing. Therefore, the system may be either a plurality of apparatuses stored in separate casings and connected through a network, or an apparatus in which a plurality of modules are stored within a single casing.

An embodiment of the present technology is not limited to the embodiments described above, and various changes and modifications may be made without departing from the scope of the present technology.

For example, the present technology can adopt a configuration of cloud computing in which one function is shared and jointly processed by a plurality of apparatuses through a network.

Further, each step described in the above mentioned flow charts can be executed by one apparatus or shared and executed by a plurality of apparatuses.

Furthermore, in the case where a plurality of processes are included in one step, the plurality of processes included in this one step can be executed by one apparatus or can be shared and processed by a plurality of apparatuses.

Moreover, as the electromagnetic wave emitted by the light emitting portion 22 in the ranging sensor 20, a sine wave, a triangular wave, or the like can be adopted in addition to a pulse.

Further, the photometry pixels 11, not only can a plurality of pixels with different aperture ratios be adopted, but a plurality of pixels with different amounts of incident light, such as a plurality of pixels with different transmittances of color filters, can also be adopted.

Furthermore, the effects described in the specification are not limiting. That is, the present disclosure can exhibit other effects.

Additionally, the present technology may also be configured as below.

(1)
A light receiving device including:
a photometry sensor configured to perform photometry by receiving light;
another sensor of which a light receiving surface which receives light is divided into a plurality of blocks; and
a control unit configured to perform exposure control to control exposure of the other sensor for each block in accordance with a result obtained by the photometry performed by the photometry sensor.

(2)
The light receiving device according to (1),
in which one or both of a ranging sensor that performs ranging by receiving light and an image sensor that performs imaging by receiving light are included as the other sensor.

(3)
The light receiving device according to (1) or (2),
in which the other sensor also serves as the photometry sensor.

(4)
The light receiving device according to (3),
in which pixels that receive light and are included in the other sensor and photometry pixels that receive light and are included in the photometry sensor are disposed on one substrate.

(5)
The light receiving device according to (3),
in which the other sensor includes, in a stacked manner, a substrate in which pixels that receive light and are included in the other sensor are disposed and a substrate in which photometry pixels that receive light and are included in the photometry sensor are disposed.

(6)
The light receiving device according to any one of (1) to (5),
in which the photometry sensor includes a plurality of pixels with different aperture ratios as photometry pixels that receive light.

(7)
The light receiving device according to any one of (1) to (6),
in which the control unit performs setting of an exposure time or an addition number which adds an exposure result of exposure for a predetermined time as the exposure control.

(8)
The light receiving device according to any one of (1) to (7),
in which the photometry sensor and the other sensor receive light that has passed through a predetermined optical system.

(9)
The light receiving device according to (1),
in which, in a case in which the photometry sensor receives light that has passed through a predetermined optical system and the other sensor receives light that has passed through an optical system different from the predetermined optical system, calibration is performed to cause a position at which a subject is shown in a photometry image obtained by receiving light in the photometry sensor to correspond to a position at which the same subject is shown in an image obtained by receiving light in the other sensor.

(10)
The light receiving device according to (1),
in which a ranging sensor that performs ranging by receiving light is included as the other sensor, and
the light receiving device further comprises a light emitting portion configured to emit electromagnetic waves serving as light received by the ranging sensor.

(11)
A control method including:
performing exposure control to control, in accordance with a photometry result of a photometry sensor that performs photometry by receiving light, exposure of another sensor of which a light receiving surface that receives light is divided into a plurality of blocks, the exposure control being performed for each block.

(12)
An electronic apparatus including:
an optical system configured to condense light; and
a light receiving device configured to receive light,
in which the light receiving device includes
a photometry sensor that performs photometry by receiving light that has passed through the optical system,

REFERENCE SIGNS LIST

- 10 photometry sensor
- 11 photometry pixel
- 20 ranging sensor
- 21 ranging pixel
- 22 light emitting portion
- 30 image sensor
- 31 imaging pixel
- 41 control unit
- 42 processing unit
- 61, 62 substrate
- 101, 111 optical system
- 112 movable mirror
- 113 EVF sensor
- 121 EVF optical system
- 131 movable half mirror
- 132 movable mirror
- 133 pentaprism
- 134 viewfinder
- 151 photometry optical system
- 152 imaging optical system
- 201 bus
- 202 CPU
- 203 ROM
- 204 RAM
- 205 hard disk
- 206 output unit
- 207 input unit
- 208 communication unit
- 209 drive
- 210 input and output interface
- 211 removable recording medium

The invention claimed is:

1. A light receiving device comprising:
a photometry sensor configured to perform photometry by receiving light;
at least one additional sensor of which a light receiving surface which receives light is divided into a plurality of blocks; and
a control unit configured to perform exposure control to control exposure of the at least one additional sensor for each block of the plurality of blocks based on a result obtained by the photometry performed by the photometry sensor,
wherein the photometry sensor is an electric view finder.

2. The light receiving device according to claim 1, wherein one or both of a ranging sensor that performs ranging by receiving light and an image sensor that performs imaging by receiving light are included as the at least one additional sensor.

3. The light receiving device according to claim 1, wherein the at least one additional sensor also serves as the photometry sensor.

4. The light receiving device according to claim 3, wherein pixels that receive light and are included in the at least one additional sensor and photodiodes that receive light and are included in the photometry sensor are disposed on one substrate.

5. The light receiving device according to claim 3, wherein the at least one additional sensor includes, in a stacked manner, a substrate in which pixels that receive light and are included in the at least one additional sensor are disposed and a substrate in which photodiodes that receive light and are included in the photometry sensor are disposed.

6. The light receiving device according to claim 1, wherein the photometry sensor includes a plurality of pixels with different aperture ratios as photodiodes that receive light.

7. The light receiving device according to claim 1, wherein the control unit performs setting of an exposure time or an addition number which adds an exposure result of exposure for a predetermined time as the exposure control.

8. The light receiving device according to claim 1, wherein the photometry sensor and the at least one additional sensor receive light that has passed through a predetermined optical system.

9. The light receiving device according to claim 1, wherein, in a case in which the photometry sensor receives light that has passed through a predetermined optical system and the at least one additional sensor receives light that has passed through an optical system different from the predetermined optical system, calibration is performed to cause a position at which a subject is shown in a photometry image obtained by receiving light in the photometry sensor to correspond to a position at which the same subject is shown in an image obtained by receiving light in the at least one additional sensor.

10. The light receiving device according to claim 1, wherein a ranging sensor that performs ranging by receiving light is included as the at least one additional sensor, and
the light receiving device further comprises a light emitting portion configured to emit electromagnetic waves serving as light received by the ranging sensor.

11. A control method comprising:
performing exposure control to control, based on a photometry result of a photometry sensor that performs photometry by receiving light, exposure of at least one additional sensor of which a light receiving surface that receives light is divided into a plurality of blocks, the exposure control being performed for each block of the plurality of blocks,
wherein the photometry sensor is an electric view finder.

12. An electronic apparatus comprising:
an optical system configured to condense light; and
a light receiving device configured to receive light,
wherein the light receiving device includes
a photometry sensor that performs photometry by receiving light that has passed through the optical system,
at least one additional sensor of which a light receiving surface that receives light that has passed through the optical system or an optical system different from the optical system is divided into a plurality of blocks, and
a control unit that performs exposure control to control exposure of the other sensor for each block in accordance with a photometry result of the photometry sensor.

a control unit that performs exposure control to control exposure of the at least one additional sensor for each block of the plurality of blocks based on a photometry result of the photometry sensor,
wherein the photometry sensor is an electric view finder.

* * * * *